US009355302B2

(12) United States Patent
He et al.

(10) Patent No.: US 9,355,302 B2
(45) Date of Patent: May 31, 2016

(54) METHOD AND ELECTRONIC EQUIPMENT FOR IDENTIFYING FACIAL FEATURES

(71) Applicant: TENCENT TECHNOLOGY (SHENZHEN) COMPANY LIMITED, Shenzhen (CN)

(72) Inventors: Jin Wen He, Shenzhen (CN); Yan Bo Long, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 14/584,366

(22) Filed: Dec. 29, 2014

(65) Prior Publication Data
US 2015/0117725 A1   Apr. 30, 2015

Related U.S. Application Data

(63) Continuation of application No. PCT/CN2014/076225, filed on Apr. 25, 2014.

(30) Foreign Application Priority Data

May 21, 2013   (CN) .......................... 2013 1 0189786

(51) Int. Cl.
G06K 9/00   (2006.01)
(52) U.S. Cl.
CPC ........ G06K 9/00268 (2013.01); G06K 9/00288 (2013.01)
(58) Field of Classification Search
CPC ....... G06K 9/80; G06K 9/50; G06K 9/00268; G06K 9/00288; G06T 2207/20144; G06T 2207/20224; G06T 2207/30232; G06T 7/2053
See application file for complete search history.

(56) References Cited

U.S. PATENT DOCUMENTS

2008/0187219 A1* 8/2008 Chen .................. G06K 9/00711
                                                          382/173
2011/0102248 A1* 5/2011 Maeno .................. G01S 7/2927
                                                          342/179

FOREIGN PATENT DOCUMENTS

| CN | 1866272 | 11/2006 | |
|---|---|---|---|
| CN | 101593272 | 12/2009 | |
| CN | 101739712 | * 6/2010 | ............... G06K 9/00 |
| CN | 102867174 | * 1/2013 | ............... G06K 9/00 |
| JP | 2004-265267 | * 9/2004 | ............... G06T 1/00 |

OTHER PUBLICATIONS

PCT International Search Report, Aug. 4, 2014.

* cited by examiner

*Primary Examiner* — Amara Abdi
(74) *Attorney, Agent, or Firm* — WPAT, P.C.; Justin King

(57) ABSTRACT

A method for identifying facial features comprises following steps: An image tracing step is performed to receive video data of a plurality of face images and to obtain a real-time background image from the video data by a video tracing technique. A data calculating step is performed to calculate a video data difference between a current face image and the real-time background image. A process setting step is performed to set an iteration number according to the video data difference. A coordinate requesting step is performed to obtain facial feature coordinates of a previous face image, the previous one of the current face image, serving as initial facial feature coordinates. A localization step is performed to obtain current facial feature coordinates of the current image by conducting an iterative calculation according to the iteration number and based on the initial facial feature coordinates.

26 Claims, 22 Drawing Sheets

| The current face image and the real-time background image are firstly received, and a gray degree treatment is then performed on the current face image and the real-time background image | S2.1 |

↓

| The difference of the transferred current face image and the real-time background image both subject to the gray degree treatment is then obtained to form a prospective view image | S2.2 |

↓

| The pixels of the foreground image are classified in at least two groups according to different criteria for evaluating their gray degree, and a weight value is given to the pixels of the foreground image that are classified within the same group | S2.3 |

↓

| The video data difference is then obtained by calculating the ratio of the weighted sum of the pixels number to the pixels number of the foreground image | S2.4 |

FIG. 5

METHOD AND ELECTRONIC EQUIPMENT FOR IDENTIFYING FACIAL FEATURES

CROSS REFERENCE

The application is a U.S. continuation application under 35 U.S.C. §111(a) claiming priority under 35 U.S.C. §120 and 365(c) to International Application No. PCT/CN2014/076225 filed Apr. 25, 2014, which claims the priority benefit of CN patent application serial No. 201310189786.1, titled "information transmitting method, information sending device, information receiving device and system" and filed on May 21, 2013, the contents of which are incorporated by reference herein in their entirety for all intended purposes.

TECHNICAL FIELD

The present invention relates to image processing technology, and more particularly to a video/image-based method for identifying facial features and an electronic equipment for implementing the method.

BACKGROUND

Identifying characteristics of a face (the facial features such as the contours of the full face, the forehead, the eyebrows, the nose, the eyes and the mouth) that is displayed in video image is the basic technique of an electronic equipment for providing functions of face reorganization, human-machine interaction (HMI) or other entertainments. For example, the face image may be edited by adding some entertainment image tools, such a hat, a glass or as mask, thereon, after the coordinate of these facial features are identified in the image; and the relative locations of these facial features displayed in video image can be determined.

The current method for identifying facial features may be applied by an electronic equipment to both identify the contours of the full face and the facial features of the face image by scanning each of the video images, and the identified information of the full face and the facial features may be then associated with each other, whereby the motion of the facial features can be comply with that of the full face during the process for displaying the video images. However, identifying the contours of the full face and the facial features as well as associating them with each other may cost huge data workloads and require large amounts of compute power. As a result, the electronic equipment may be operated at a speed that can not satisfy the user requirement or operation context due to the huge data workloads. Besides, merely identifying the contours of the full face and the facial features by scanning each of the video images particularly but not considering the relative size of the full face among different face images may cause the motion of the facial features discontinue during the process of displaying the video images, and thus adversely affect the display performance of the electronic equipment.

Therefore, there is a need of providing an improved method for identifying facial features and an electronic equipment for implementing the method to obviate the drawbacks encountered from the prior art.

SUMMARY

A method for identifying facial features and an electronic equipment for implementing the method are provided to improve the operating speed of an electronic equipment used to identifying facial features from a plurality of video images and to make the motion of the facial features smoother during the process for displaying the video images, thereby the display performance of the electronic equipment can be improved.

In accordance with an aspect, a method for identifying facial features is provided, wherein the method comprises steps as follows: An image tracing step is firstly performed to receive video data of a plurality of face images and to obtain a real-time background image from the video data by a video tracing technique during a process for displaying the plurality of face images. A data calculating step is then performed to calculate a video data difference between a current face image and the real-time background image. Next, a process setting step is performed to set an iteration number according to the video data difference. Subsequently, a coordinate requesting step is performed to obtain facial feature coordinates of a previous face image, the previous one of the current face image, serving as initial facial feature coordinates. A localization step is then performed to obtain current facial feature coordinates of the current image, wherein an iterative calculation is conducted according to the iteration number to localize the facial features of the current image based on the initial facial feature coordinates.

In accordance with another aspect, an apparatus for identifying facial features is provided, wherein the apparatus comprises an image tracing module, a data calculating module, a process setting module, a coordinate requesting module and a localization module. The image tracing module is used to request video data of a plurality of face images and to obtain a real-time background image from the video data by a video tracing technique during a process for displaying the plurality of face images. The data calculating module is used to calculate a video data difference between a current face image and the real-time background image. The process setting module is used to set an iteration number according to the video data difference. The coordinate requesting module is used to obtain facial feature coordinates of a previous face image, the previous one of the current face image, to serve as initial facial feature coordinates. The localization module is used to obtain current facial feature coordinates of the current image by conducting an iterative calculation according to the iteration number to localize the facial features of the current image based on the initial facial feature coordinates.

In comparison with the current method, current facial feature coordinates of a current image can be obtained by conducting an iterative calculation based on video data of a previous face image, the previous one of the current face image, thus the video images can be displayed with a quicker operating speed by the electronic equipment of the aforementioned embodiments of the present invention. In addition the display performance of the electronic equipment can be improved due to smoother motion of the identified facial features during the process for displaying the video images.

The above objects and advantages of the present invention will become more readily apparent to those ordinarily skilled in the art after reviewing the following detailed descriptions and accompanying drawings:

BRIEF DESCRIPTION OF THE DRAWINGS

FIG. 5 is a process diagram illustrating a step S5 for calculating a video data difference between a current face image and the background image, in accordance with the first embodiment of the present invention;

DETAILED DESCRIPTION OF PREFERRED EMBODIMENTS

It is to be noted that the following descriptions of preferred embodiments of this invention are presented herein for purpose of illustration and description only. It is not intended to be exhaustive or to be limited to the precise form disclosed.

First Embodiment

Figure 1:
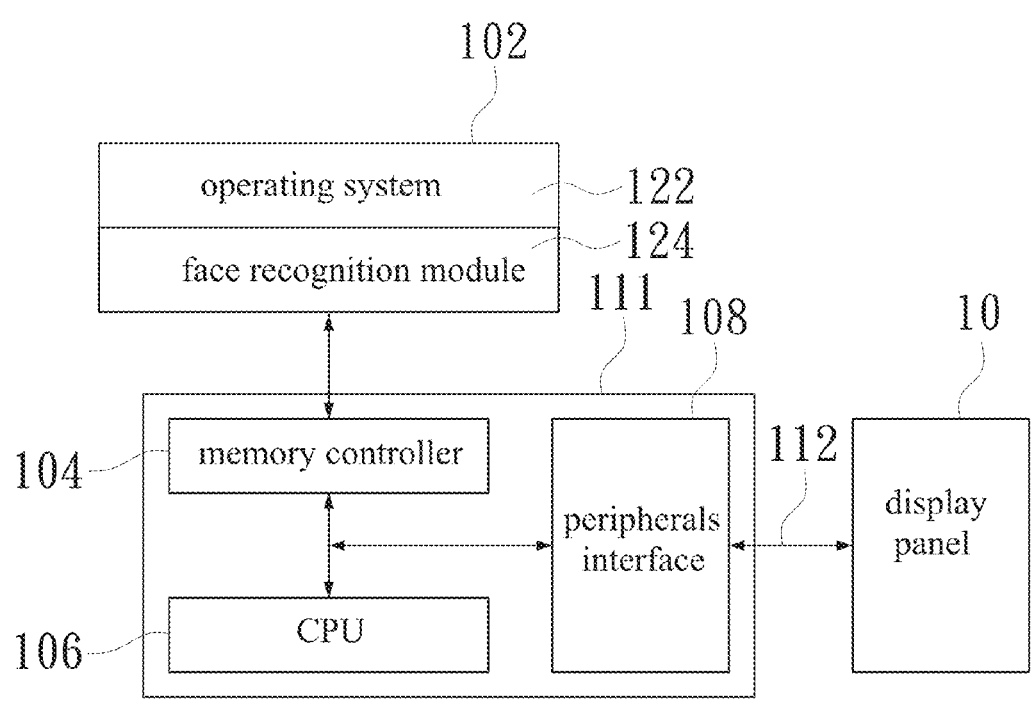
FIG. 1 is a diagram illustrating an electronic equipment used to implementing a method for identifying facial features, in accordance with a first embodiment of the present invention.

FIG. 1 is a diagram illustrating an electronic equipment used to implementing a method for identifying facial features, in accordance with a first embodiment of the present invention. The electronic equipment 1 comprises a display panel 10 used to display video images. The electronic equipment 1 may be a computer, a portable electronic terminal apparatus, or a computing apparatus similar thereto.

The electronic equipment 1 includes a memory 102, a memory controller 104, one or more processing units (CPU's) 106, a peripherals interface 108, and a display panel 10. These components communicate over the one or more communication buses or signal lines 112. It should be appreciated that the server 100 is only one example of a server, and that the electronic equipment 1 may have more or fewer components that shown, or a different configuration of components. The various components shown in FIG. 1 may be implemented in hardware, software or a combination of both hardware and software, including one or more signal processing and/or application specific integrated circuits.

The memory 102 may include high speed random access memory and may also include non-volatile memory, such as one or more magnetic disk storage devices, flash memory devices, or other non-volatile solid state memory devices. In some embodiments, the memory 102 may further include storage remotely located from the one or more processors 106, for instance, network attached storage accessed via network interface controller and a communications network (not shown) such as the Internet, intranet(s), Local Area Networks (LANs), Wireless Local Area Networks (WLANs), Storage Area Networks (SANs) and the like, or any suitable combination thereof. Access to the memory 102 by other components of the server 100, such as the CPU 106 and the peripherals interface 108 may be controlled by the memory controller 104.

The peripherals interface 108 couples the input and output peripherals of the device to the CPU 106 and the memory 102. The one or more processors 106 run various software programs and/or sets of instructions stored in the memory 102 to perform various functions for the electronic equipment 1 and to process data.

In some embodiments, the peripherals interface 108, the CPU 106, and the memory controller 104 may be implemented on a single chip, such as a chip 111. In some other embodiments, they may be implemented on separate chips.

The display panel 10 displays visual content such as texts, videos, images, animations, or combinations thereof. In one embodiment, the display panel 10 is a liquid crystal display panel.

In some embodiments, there are software components stored in the memory 102. For example, the software components include an operating system 122, and a face recognition module 124.

The operating system 122 (e.g., Darwin, RTXC, LINUX, UNIX, OS X, WINDOWS) includes various software components and/or drivers for controlling and managing general system tasks (e.g., memory management, storage device control, power management, etc.) and facilitates communication between various hardware and software components. The face recognition module 124 is configured for implementing the method for identifying facial features, and the method will be described in detail accompanying with embodiments as follows.

Figure 2:
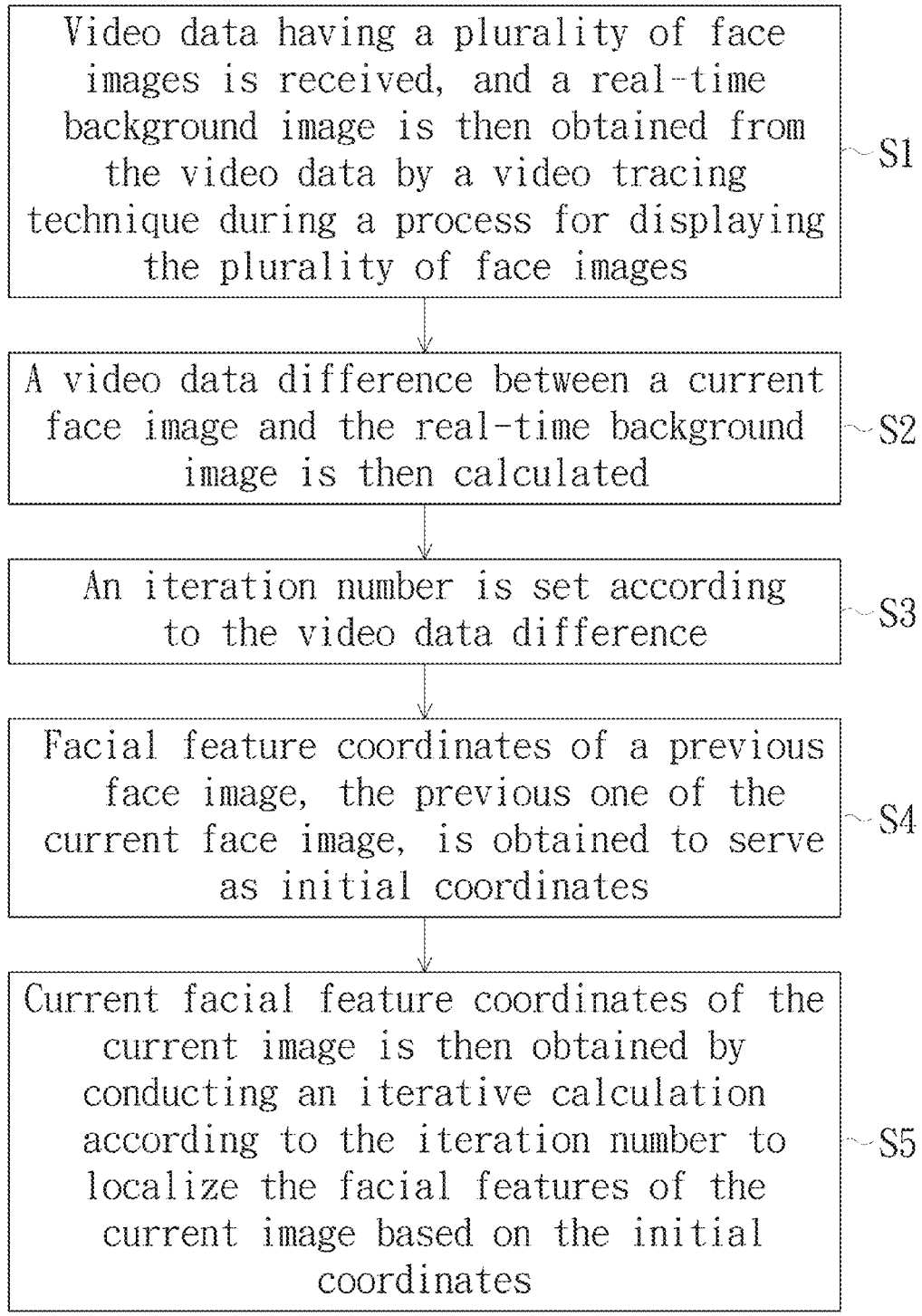
FIG. 2 is a block diagram illustrating the method for identifying facial features, in accordance with the first embodiment of the present invention.

A practical embodiment for implementing the method to identify facial features is described as follows:

FIG. 2 is a block diagram illustrating the method for identifying facial features, in accordance with the first embodiment of the present invention, wherein the method for identifying facial feature comprises steps as follows:

Video data having a plurality of face images is received, and a real-time background image is then obtained from the video data by a video tracing technique during a process for displaying the plurality of face images (see step S1).

A video data difference between a current face image and the real-time background image is then calculated (see step S2).

Next, an iteration number is set according to the video data difference (see step S3).

Subsequently, facial feature coordinates of a previous face image, the previous one of the current face image, is obtained to serve as initial facial feature coordinates (see step S4).

Current facial feature coordinates of the current image is then obtained by conducting an iterative calculation according to the iteration number to localize the facial features of the current image based on the initial facial feature coordinates (see step S5).

By adopting the method for identifying facial features provided by the first embodiment, current facial feature coordinates of a current image can be obtained by conducting an iterative calculation based on video data of a previous face image, the previous one of the current face image, thus face images can be displayed with a quicker operating speed, and the display performance of the electronic equipment can be improved due to smoother motion of the identified facial features during the process for displaying the face images.

Figure 3:
FIG. 3 illustrates a single image excerpted form a process for displaying video data, in accordance with an embodiment of the present invention.

In some embodiments of the present invention, the detailed process for proceeding the aforementioned steps may be varied; and in a preferred embodiment, the detailed process and mechanism of these steps are described as followed:

The video data aforementioned in the step S1 is a video file, such as a move downloaded by a user of the electronic equipment 1 or a short video filmed or produced by the user, stored in a memory medium established in the electronic equipment 1. Alternatively, the video data may be video streaming, such as online videos or online animation, obtained by accessing online video sites through internet. The video data also can be real-time images obtained from a real-time video communication system through internet, e.g. the real-time photos and pictures of other people obtained along with video chatting or the images obtained by real-time monitoring. In the present embodiment, the video data at least comprises a face image, and the motion of the face images can be observed by displaying the video data. FIG. 3 illustrates a single image excerpted form a process for displaying the video data, in accordance with an embodiment of the present invention (wherein a bookmarker image is presented to illustrate the current face image as mentioned).

Figure 4:
FIG. 4 illustrates a real-time background image, in accordance with an embodiment of the present invention.

In the present embodiment, a video tracing technique based on background subtraction algorithm is applied to trace the face images to determine the video data difference among the face images, so as to obtain the real-time background image. Since the real-time background image is obtained by generalizing the previous face images that are received by the electronic equipment 1 before the current face image, thus the real-time background image not only comprises the common background region of the previous face images but also comprises shadow region that occurs along the motion of the face image, as shown in FIG. 4 (wherein a real-time background image of the bookmarker image is presented to illustrate that of the current face image).

FIG. 5 is a process diagram illustrating a step S5 for calculating a video data difference between a current face image and the background image, in accordance with the first embodiment of the present invention, wherein the step S5 comprises sub-steps as follows:

The current face image and the real-time background image are firstly received, and a gray degree treatment is then performed on the current face image and the real-time background image (see Step S2.1). In some embodiments of the present invention, the gray degree treatment is a gray degree transformation used to transform the current face image and the real-time background image into grayscale images. In other words, the transformed current face image and the transformed real-time background image are only composed by pixels each of which has a brightness ranging from 0% (black) to 100% (white). For example, when the current face image and the real-time background image are transformed into 8-bit gray-level (256×256 pixels) images, each pixels of the transformed current face image and the transformed real-time background image has a brightness ranging from 0% (black) to 100% (white).

The difference of the transferred current face image and the real-time background image both subject to the gray degree treatment is then obtained to form a prospective view image (see step S2.2). In practice, the gray degree of each pixel of the transferred real-time background image is deducted from the gray degree of the corresponding pixel of the transferred current face image, whereby the integration of the gray degree difference of these pixels can be referred to as a foreground image.

Figure 6:
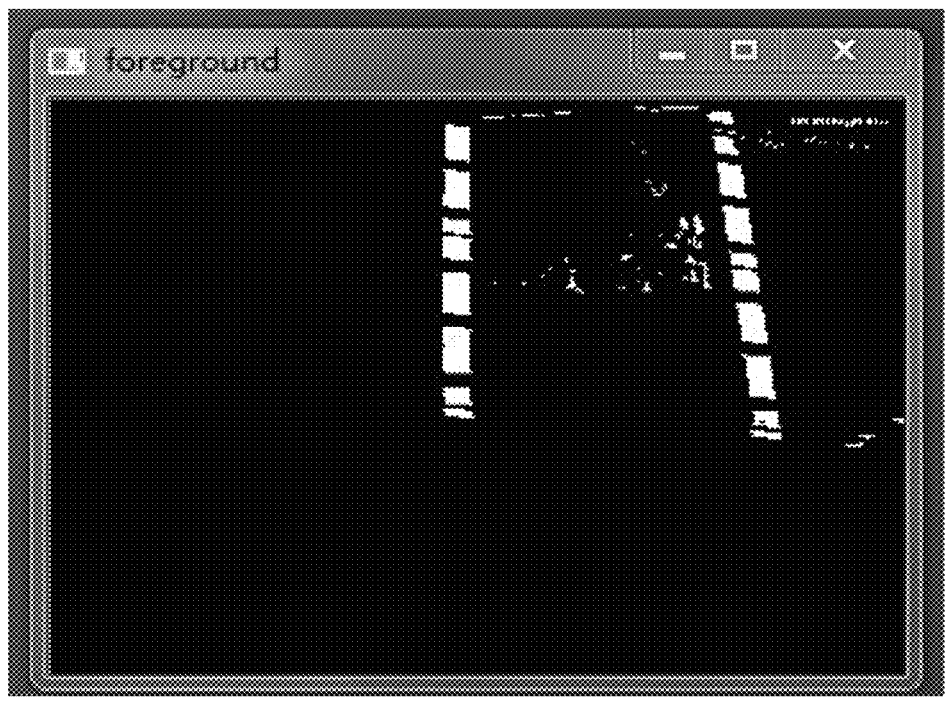
FIG. 6 is a binary image of a foreground image, in accordance with an embodiment of the present invention.

In the background subtraction process, if regions of each face image that remain constant during the displaying process until now, the gray degree difference of these pixels on pertinent regions can be 0 (it means that the gray degree of these regions on the foreground image is 0, and is referred to as "Black"); and if regions of each face image that vary during the displaying process, the gray degree difference of these pixels on the pertinent regions between the subtraction of the transferred real-time background image and the transferred current face image cannot be 0 (it means that the gray degree of these regions on the foreground image is not 0, and is referred to as "not Black"). Thus, the foreground image can reveal the regions of the current face image that have been varied against the real-time background image. If the foreground image is further subjected to a binary treatment, the regions of the current face image that have been varied against the real-time background image can be determined more easily. For example, if the gray degree of a pixel of the foreground image is greater than a threshold value (such as 0), the gray degree of the pixel is reset as 225 (that is referred to as "White"); if the gray degree of a pixel of the foreground image is not greater than the threshold value, the gray degree of the pixel is reset as 0 (that is referred to as "Black"). Thus, by observing the black-and-white (binary) image, as shown in FIG. 6, the regions of the current face image that have been varied against the real-time background image can be determined more easily.

The pixels of the foreground image are classified in at least two groups according to different criteria for evaluating their gray degree, and a weight value is given to the pixels of the foreground image that are classified within the same group (see step S2.3). For example, the pixels of the foreground image are classified in two groups, wherein the pixels of the foreground image with gray degree ranging from 0 to 20 are classified in one group, and the pixels of the foreground image with gray degree ranging from 21 to 225 are classified in another group. A weight value 0 is then given to the pixels of the foreground image with gray degree ranging from 0 to 20, and a weight value 1 is then given to the pixels of the foreground image with gray degree ranging from 21 to 225. In yet another example, the pixels of the foreground image are classified in four groups according to 4 criteria in evaluating their gray degree respectively ranging from 0 to 45, from 46 to 100, from 101 to 175 and from 176 to 225. A weight value 0.1 is then given to the first group of which pixels of the foreground image have gray degree ranging from 0 to 45, a weight value 0.2 is then given to the second group of which the pixels of the foreground image have gray degree ranging from 46 to 100, a weight value 0.7 is then given to the third group of which the pixels of the foreground image have gray degree ranging from 101 to 175, and a weight value 0.9 is then given to the fourth group of which the pixels of the foreground image have gray degree ranging from 176 to 225.

The video data difference is then obtained by calculating the ratio of the weighted sum of the pixels number to the pixels number of the foreground image (see step S2.4). The aforementioned second example in which the pixels of the foreground image are classified in four groups are used to describe the detailed process for obtaining the video data difference. If the first group has 100 pixels of the foreground image with gray degree ranging from 0 to 45, the second group has 150 pixels of the foreground image with gray degree ranging from 46 to 100, the third group has 200 pixels of the foreground image with gray degree ranging from 101 to 175, and the fourth group has 250 pixels of the foreground image with gray degree ranging from 176 to 225, the video data difference can be calculated using the following formula:

(100×0.1+150×0.2+200×0.7+250×0.9)/(100+150+200+250)=0.58

However, in some other embodiments of the present invention, the video data difference may be a product of the result of the formula and a certain experical value.

In the present embodiment, the iteration number as set forth in the step S3 is proportional to the video data difference. In other words, if the video data difference is getting greater, the iteration number must grow up in the same proportion.

The facial feature coordinates of the previous face image as set forth in the step S4 can be also obtained by the method for identifying facial features described in the present embodiment and then be stored in a memory medium established in the electronic equipment 1 or a server in connection with the electronic equipment 1 by a communication linkage.

In the step S5, an algorithm based on an active shape model (ASM) is applied to conduct an iterative calculation according to the set iteration number to localize the facial features of the current image based on the initial facial feature coordinates.

Second Embodiment

According to the first embodiment, the method for localizing the current facial feature coordinates of the current image, an iterative calculation is necessary to obtain the current facial feature coordinates of the current image. However, in the context while the face images remain unchanged during the process of displaying, the current facial feature coordinates of the current image could not be changed against the facial feature coordinates of the previous face image. Thus, the facial feature coordinates of the current image resulted from the iterative calculation may identical with the facial feature coordinates of the previous face image. To a certain extant, the step of conducting the iterative calculation may be redundant and cost unnecessary computing resources to reduce the operation speed of the electronic equipment 1.

Figure 7A:
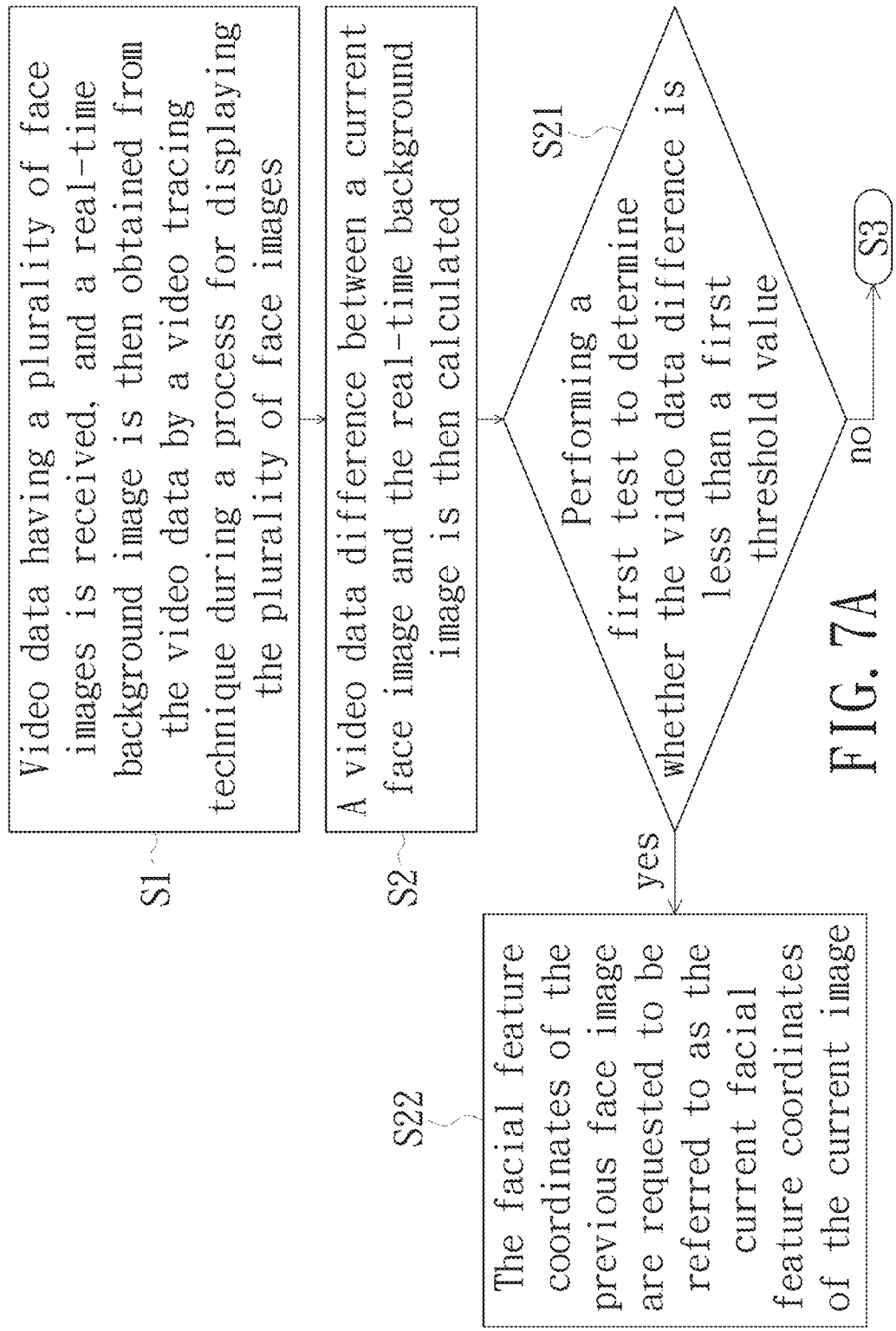
FIGS. 7A and 7B are block diagrams illustrating the method for identifying facial features, in accordance with a second embodiment of the present invention.
Figure 7B:
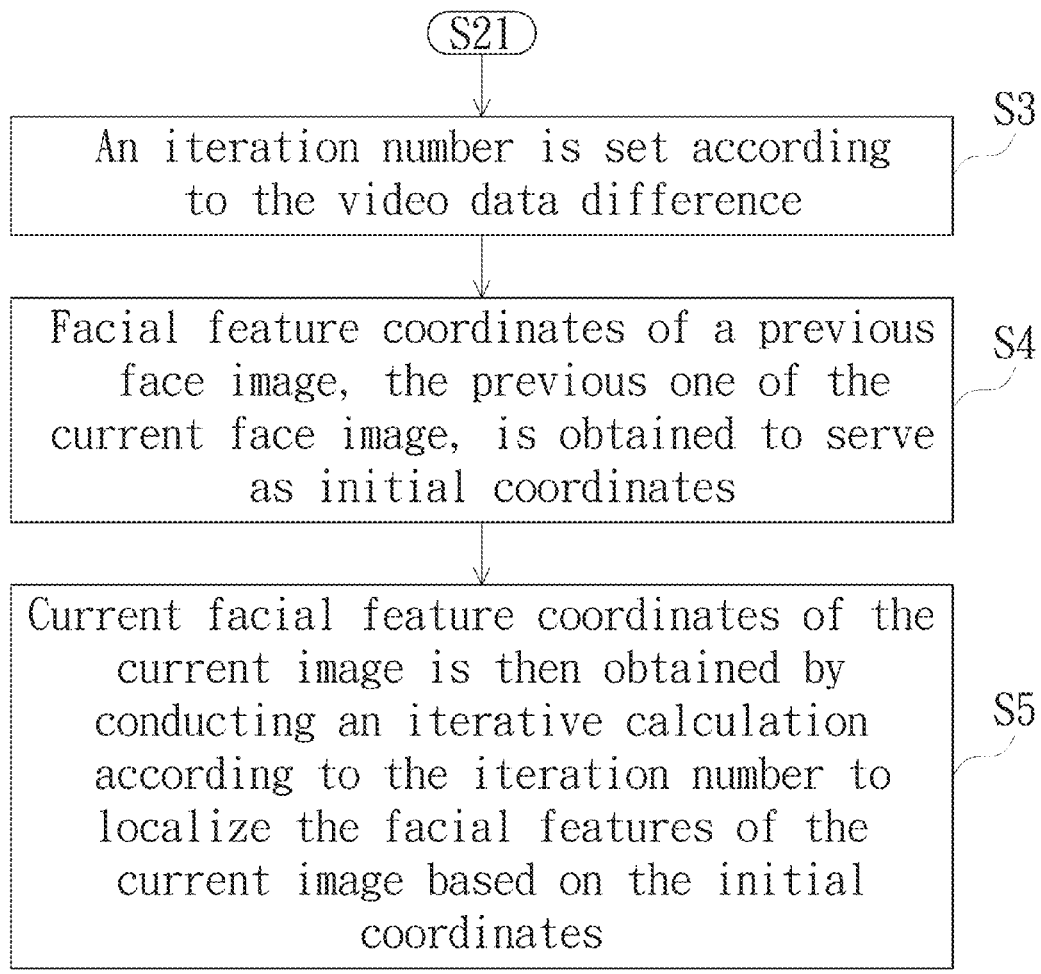

A solution to the drawbacks encountered from the first embodiment is provided. FIG. 7 is a block diagram illustrating the method for identifying facial features, in accordance with a second embodiment of the present invention, wherein the steps of the second embodiment are similar with that of the first embodiment except that after the step S2 is carried out, the method further comprises steps as follows:

A first test (see step S21) is performed to determine whether the video data difference is less than a first threshold value (e.g. 0.01%). If the video data difference is not less than the first threshold value, the process will proceed to perform the step S3; and if the video data difference is less than the first threshold value, it means that the current facial feature coordinates of the current image are nearly not changed against the facial feature coordinates of the previous face image, or means that the changes among the face images during the process of displaying are too minor to be perceived with eyes, thus the process is then proceed to perform a step S22 as follows:

The facial feature coordinates of the previous face image are requested to be referred to as the current facial feature coordinates of the current image.

In sum, the iterative calculation is omitted and the facial feature coordinates of the previous face image are directly used to serve as the current facial feature coordinates of the current image, in the present embodiment, while a context that the face images remain unchanged during the process of displaying is determined. Accordingly, computing resources can be saved and the operation speed of the electronic equipment 1 cane improved.

Third Embodiment

According to the first and the second embodiments, the method for localizing the current facial feature coordinates of the current image, an iterative calculation used to calculate all the current facial feature coordinates of the current image is necessary. However, in the context while most regions of the face images remain unchanged during the process of displaying, the current facial feature coordinates of the current image involved in the unchanged regions could be identical with the facial feature coordinates of the previous face image involved in the same regions. To a certain extant, the iterative calculation conducted in the unchanged regions may thus be redundant and cost unnecessary computing resources to reduce the operation speed of the electronic equipment 1.

Figure 8A:
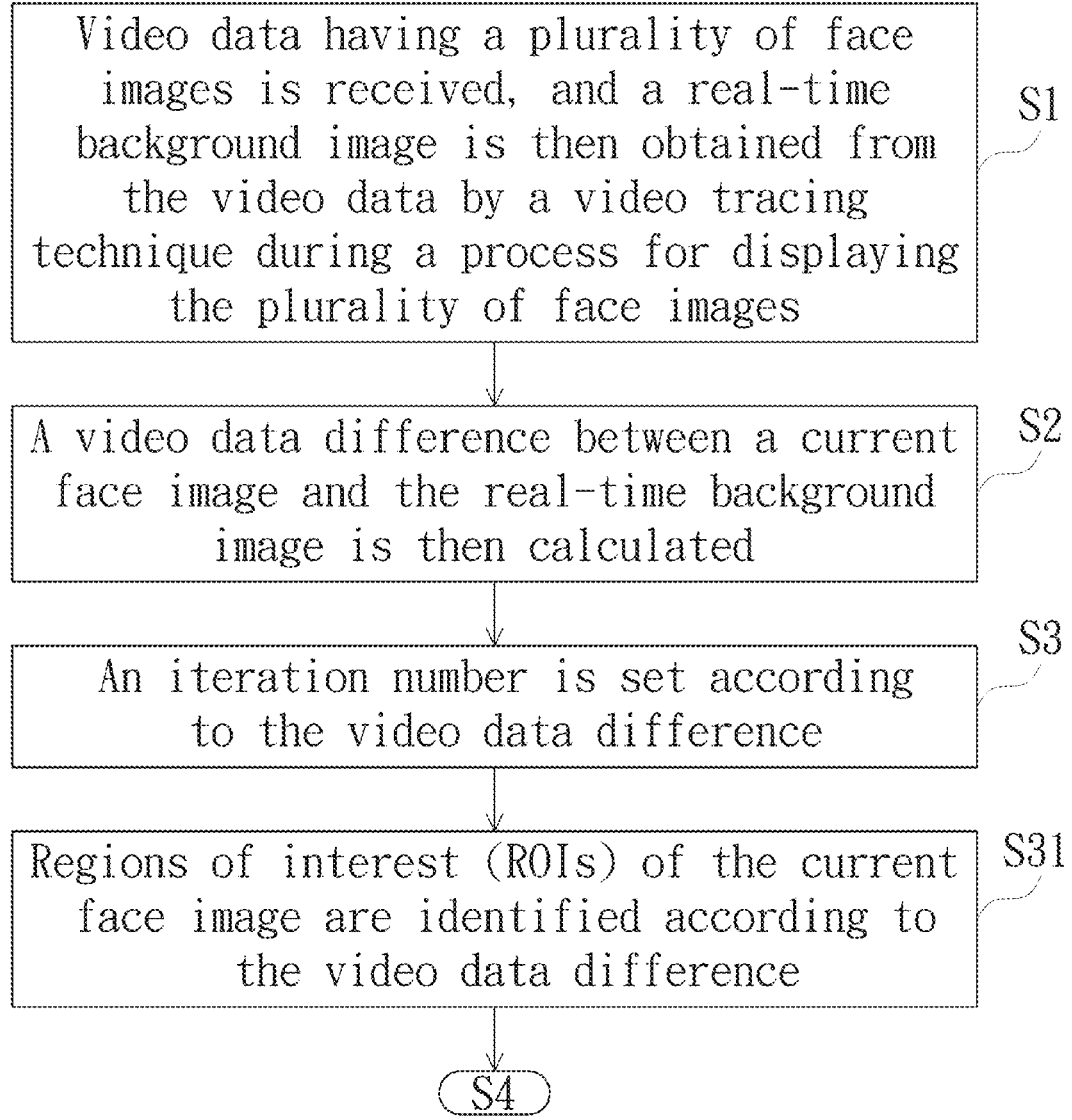
FIGS. 8A and 8B are block diagrams illustrating the method for identifying facial features, in accordance with a third embodiment of the present invention.
Figure 8B:
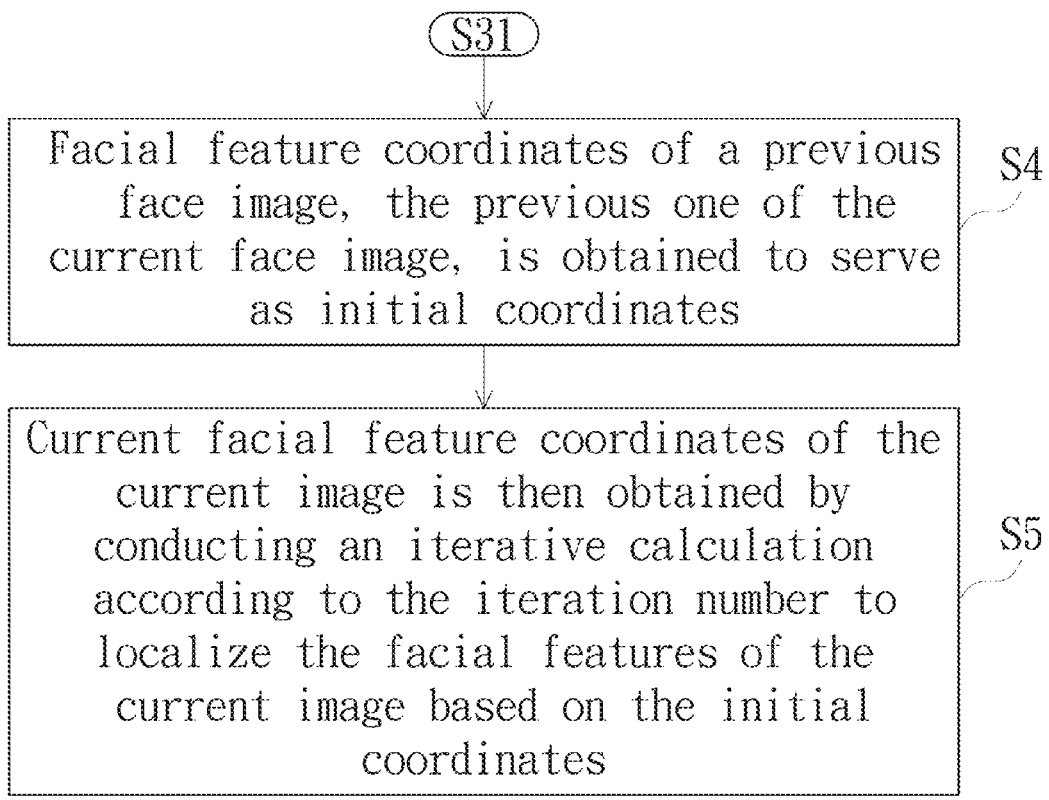

A solution to the drawbacks encountered from the first and the second embodiments is provided for identifying facial features. FIG. 8 is a block diagram illustrating the method for identifying facial features, in accordance with a third embodiment of the present invention, wherein the steps of the third embodiment are similar with that of the first and the second embodiments except that after the step S3 is carried out, the method further comprises steps as follows:

Regions of interest (ROIs) of the current face image are identified according to the video data difference (see step S31).

In practice, ROIs of the current face image are identified by comparing and tracing the positions of a human face that respectively exist in the current face image and the previous face image, whereby a human face moving region is determined. In the present embodiment, the human face moving region is determined by measuring the moving distances along an X axis (the horizontal distance) and a Y axis (the vertical distance) of the human faces varying between the current face image and the previous face image. In some embodiments of the present invention, the moving distances may be a product of the video data difference and a constant (e.g. a), wherein the constant (a) may be a certain experical value. As the video data difference is getting greater, the human face moving region is getting bigger, and the square measure of the ROIs is also getting bigger.

In addition, the step S31 may further comprise steps of performing an illumination normalization treatment on the ROIs to prevent the subsequent calculation from being adversely effected by light illumination as the ROIs is illuminated by various light sources.

The subsequent step S5 corresponding to the step S31 is then performed by conducting an iterative calculation to obtain the current facial feature coordinates of the current image merely based on the initial facial feature coordinates involved in the ROIs.

In sum, mere the current facial feature coordinates of the current image involved in the ROIs, in the present embodiment, are obtained by the iterative calculation. Accordingly, computing resources can be saved and the operation speed of the electronic equipment 1 cane improved.

Fourth Embodiment

According to the third embodiment, the method for localizing the current facial feature coordinates of the current image, an iterative calculation is necessary to obtain the current facial feature coordinates of the current image. However, in the context while a great change occurs among the face images during the process of displaying, accurate current facial feature coordinates of the current image could not be obtained by merely performing the iterative calculation. In the worst case, the current facial feature coordinates of the current image may not be obtained by the iterative calculation.

Figure 9A:
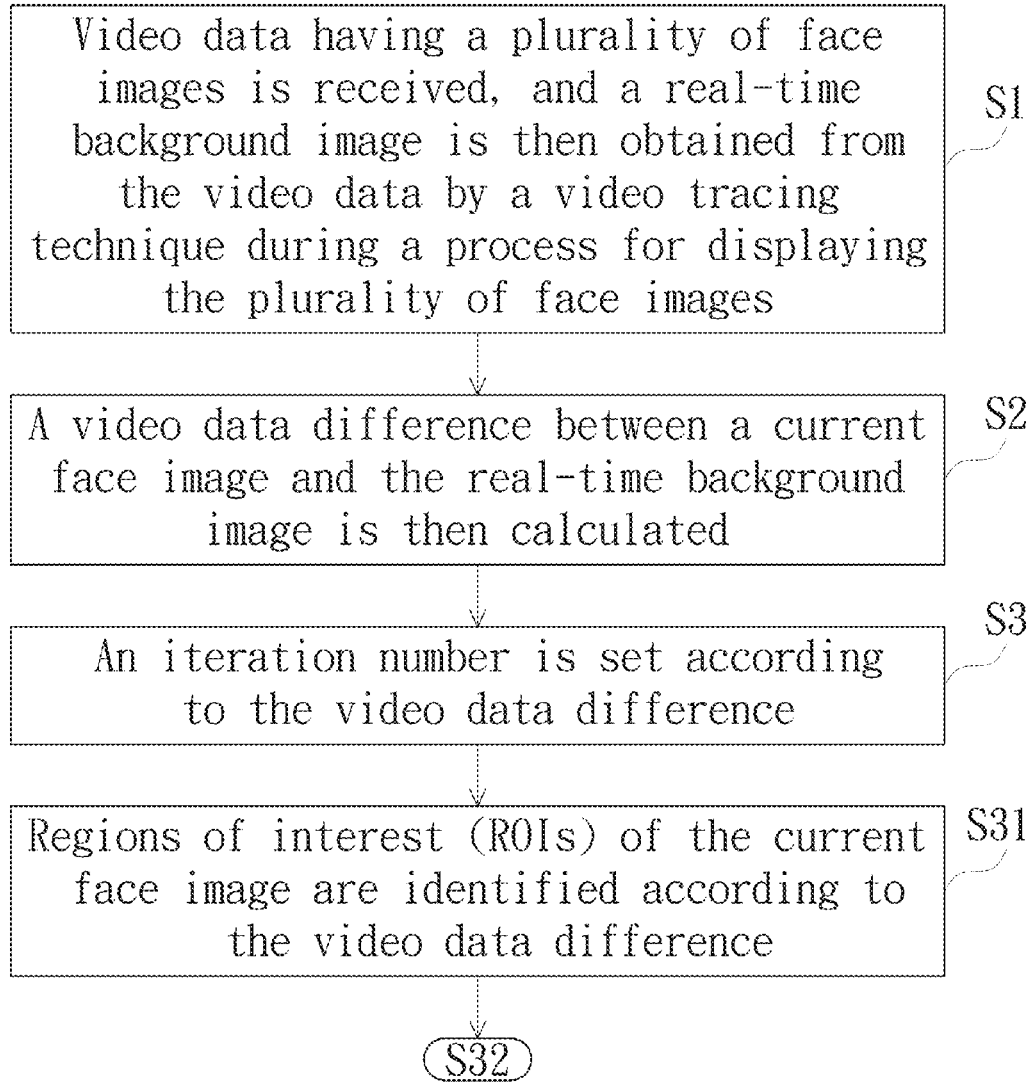
FIGS. 9A, 9B and 9C are block diagrams illustrating the method for identifying facial features, in accordance with a fourth embodiment of the present invention.
Figure 9B:
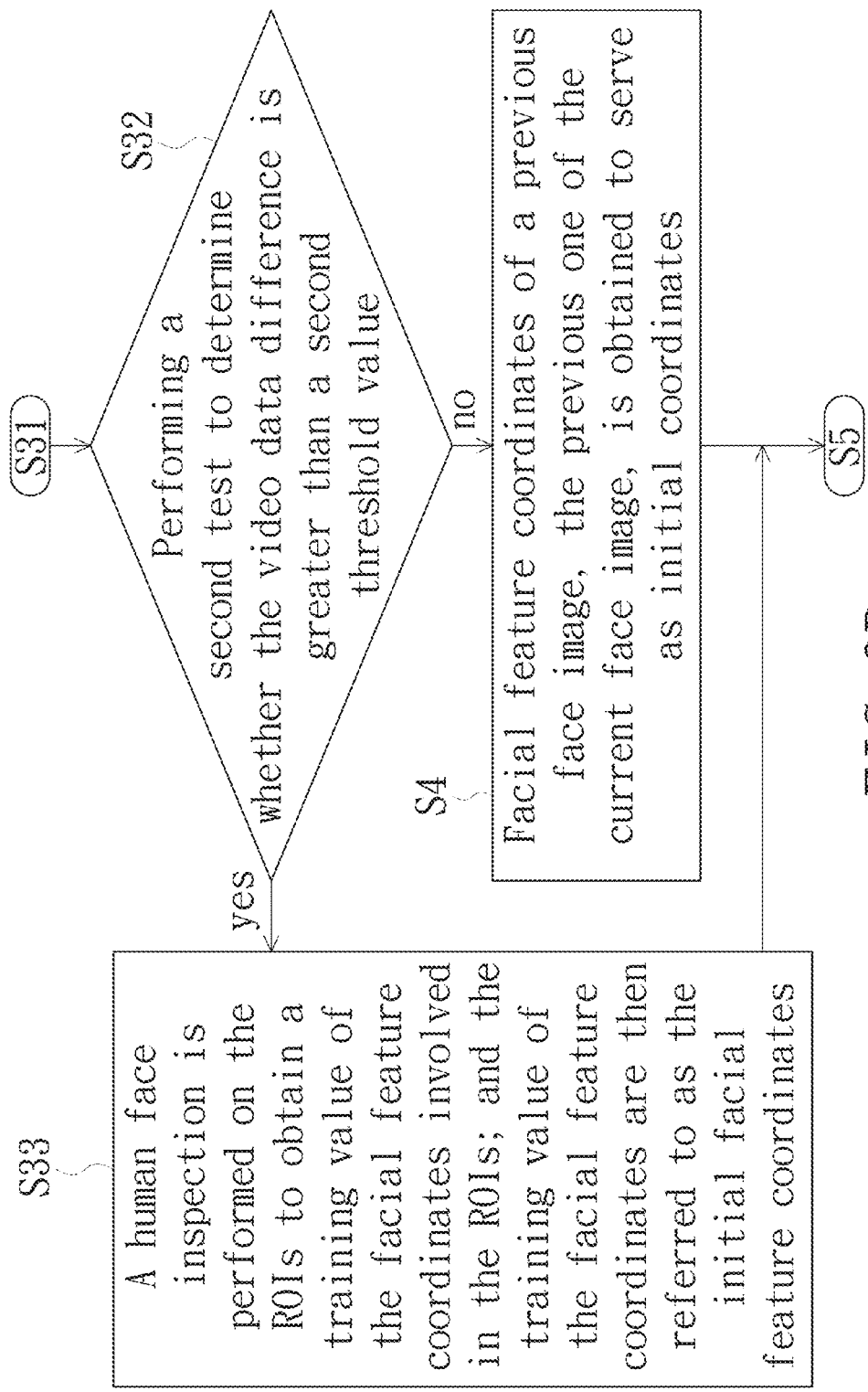
Figure 9C:
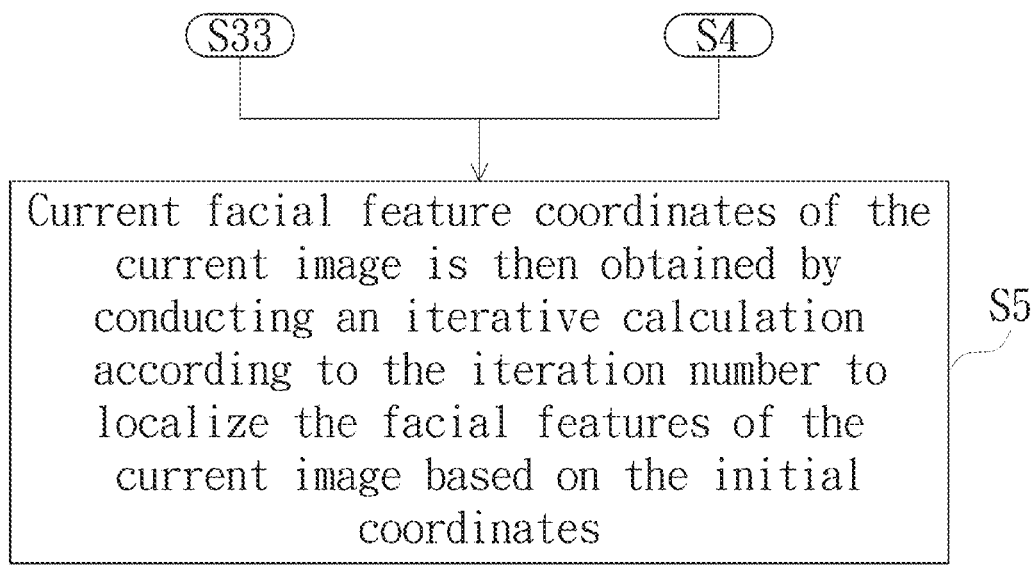

A solution to the drawbacks encountered from the third embodiment is provided. FIG. 9 is a block diagram illustrating the method for identifying facial features, in accordance with a fourth embodiment of the present invention, wherein the steps of the fourth embodiment are similar with that of the third embodiment except that after the step S31 is carried out, the method further comprises steps as follows:

A second test (see step S32) is performed to determine whether the video data difference is greater than a second threshold value (e.g. 8%). If the video data difference is not greater than the second threshold value, the process is then proceed to perform the step S4; and if the video data difference is greater than the second threshold value, the process will proceed to perform a step S33 as follows:

A human face inspection is performed on the ROIs to obtain a training value of the facial feature coordinates involved in the ROIs; the training value of the facial feature coordinates are then referred to as the initial facial feature coordinates; and the process is subsequently proceed to perform the step S5. In the present embodiment, the training value of the facial feature coordinates can be obtained by performing an algorithm based on ASM with a great number of samples.

In sum, the initial facial feature coordinates, in the present embodiment, can be redefined according to the training value of the facial feature coordinates, while a context that a great change occurs among the face images during the process of displaying is determined. Accordingly, computing resources can be saved and the operation speed of the electronic equipment 1 cane improved.

Fifth Embodiment

Figure 10A:
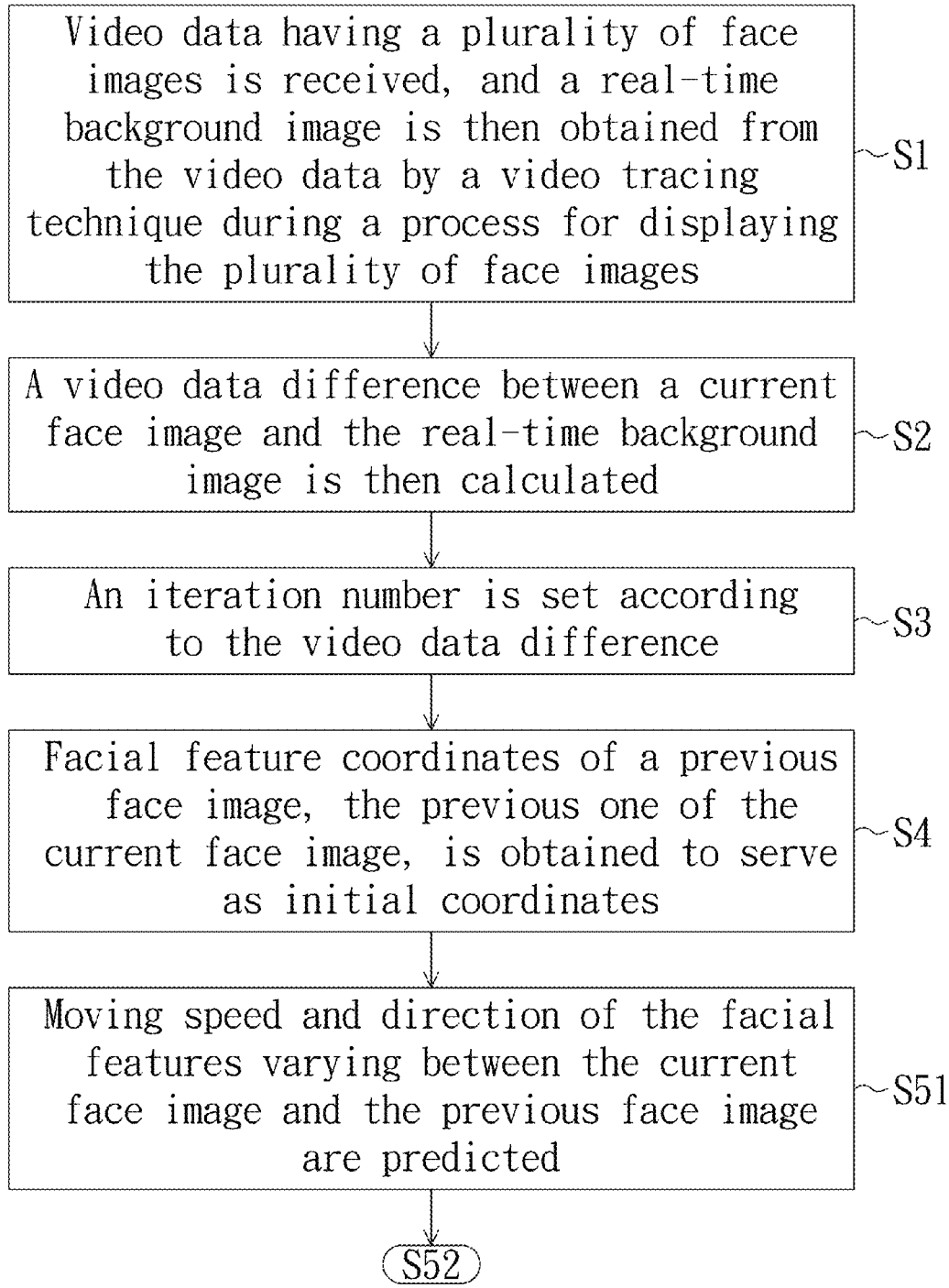
FIGS. 10A and 10B are block diagrams illustrating the method for identifying facial features, in accordance with a fifth embodiment of the present invention.
Figure 10B:
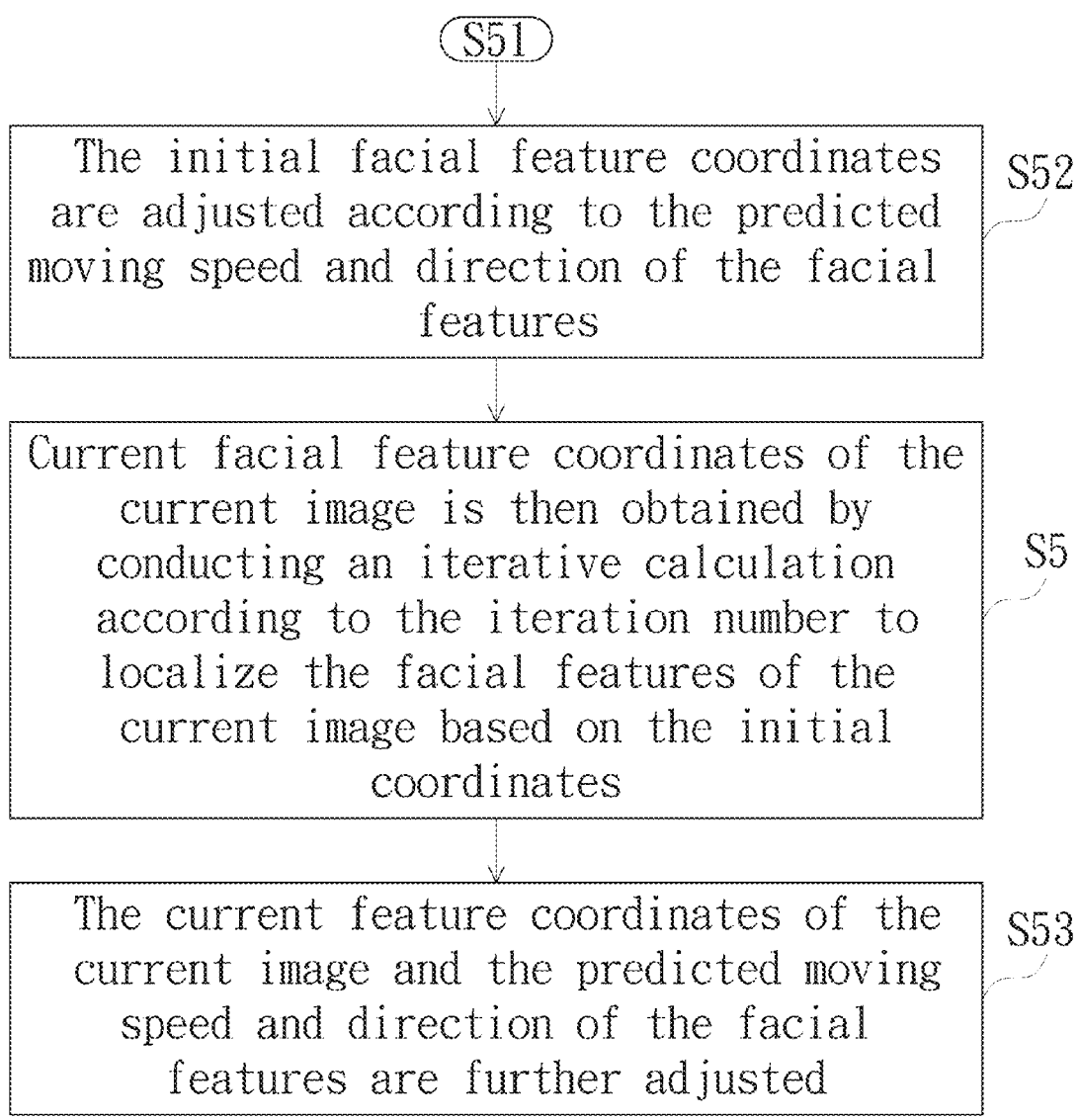

For the purpose of obtaining more accurate current facial feature coordinates of the current image, an improved method for identifying facial features is provided. FIG. 10 is a block diagram illustrating the method for identifying facial features, in accordance with a fifth embodiment of the present invention, wherein the steps of the fifth embodiment are similar with that of the first embodiment except that prior to the step S5, the method further comprises steps as follows:

Moving speed and direction of the facial features varying between the current face image and the previous face image are predicted (see step S51). In the present embodiment, the moving speed and direction of the facial features can be predicted by applying a Kalman filter.

The initial facial feature coordinates are adjusted according to the predicted moving speed and direction of the facial features (see step S52). In detail, the initial facial feature coordinates are inputted into the Kalman filter; the moving speed and direction of the facial features varying between the current face image and the previous face image are predicted can be predicted by the Kalman filter; the initial facial feature coordinates are adjusted according to the predicted moving speed and direction of the facial features; and adjusted initial facial feature coordinates are subsequently output.

The iterative calculation of the step S5 corresponding to the present embodiment is thus performed based on the adjusted initial facial feature coordinates to obtain the current feature coordinates of the current image.

In addition, after the step S5 is carried out, the method further comprises steps as follows:

The current feature coordinates of the current image and the predicted moving speed and direction of the facial features are further adjusted (see step S53). In the present embodiment, the predicted moving speed and direction of the facial features can be further adjusted by the Kalman filter according to the current feature coordinates of the current image; and the current feature coordinates of the current image can be further adjusted according to the predicted moving speed and direction of the facial features adjusted by the Kalman filter.

In sum, Kalman filter is applied to predict the moving speed and direction of the facial features varying between the current face image and the previous face image. The initial facial feature coordinates can be adjusted according to the predicted moving speed and direction of the facial features. The current feature coordinates of the current image obtained by the step S5 and the predicted moving speed and direction of the facial features can be further adjusted. Such that, more accurate current facial feature coordinates of the current image more accurate current facial feature coordinates of the current image can be obtained.

Sixth Embodiment

Figure 11A:
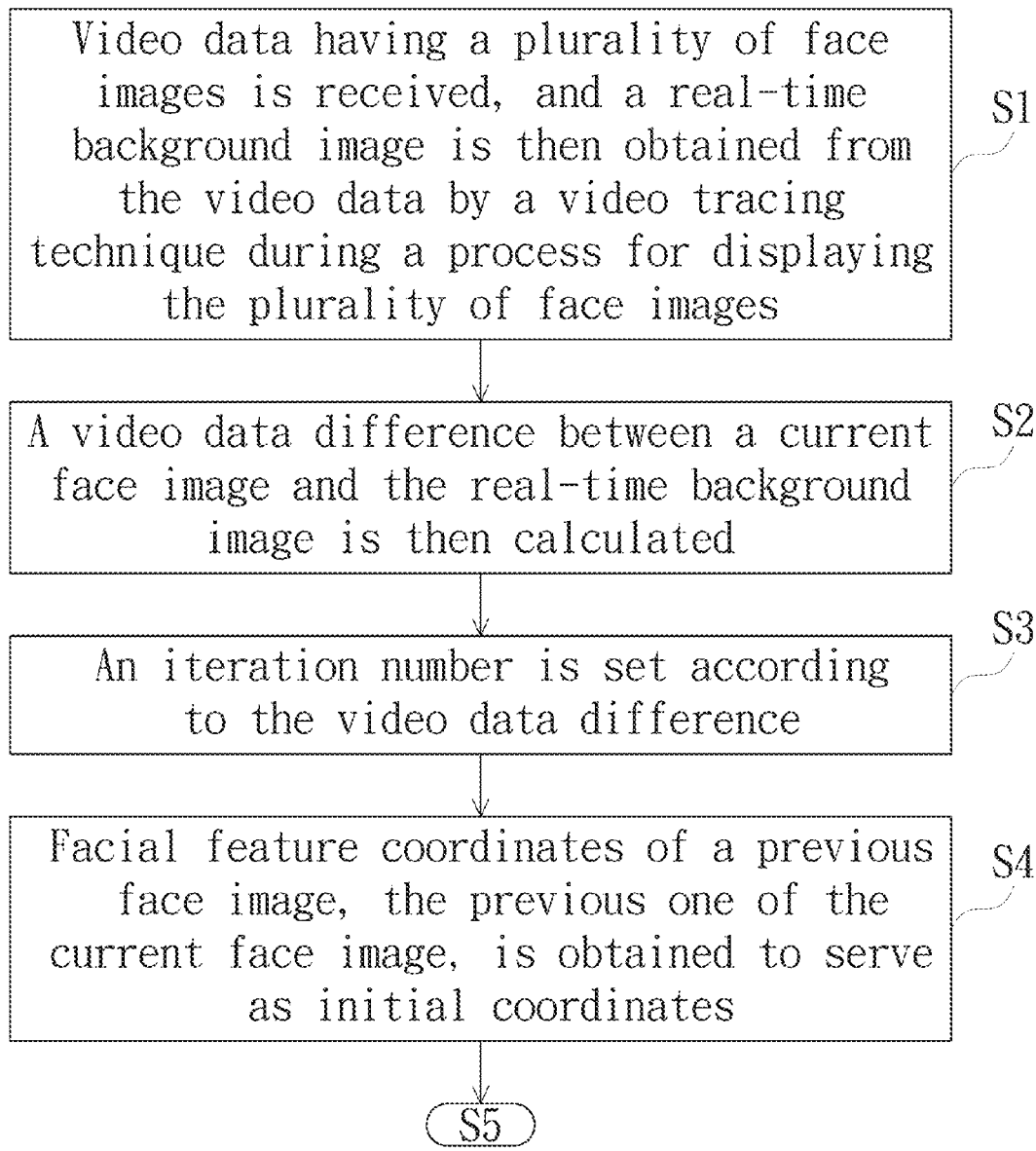
FIGS. 11A and 11B are block diagrams illustrating the method for identifying facial features, in accordance with a sixth embodiment of the present invention.
Figure 11B:
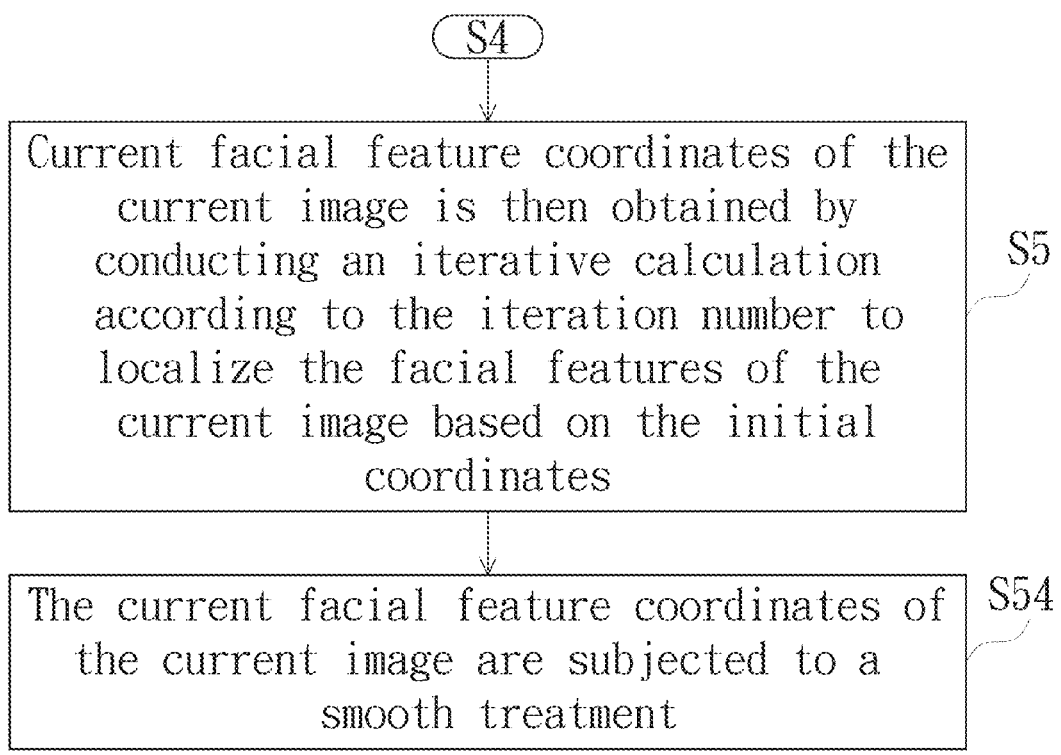

For the purpose of making the motion of the facial features smoother, an improved method for identifying facial features is provided. FIG. 11 is a block diagram illustrating the method for identifying facial features, in accordance with a sixth embodiment of the present invention, wherein the steps of the fifth embodiment are similar with that of the first embodiment except that after the step S5 is carried out, the method further comprises steps as follows:

The current facial feature coordinates of the current image are subjected to a smooth treatment (see step S54). In the present embodiment, the smooth treatment can be implemented by adjusting the current facial feature coordinates of the current image and the facial feature coordinates of a previous face image with the following formula: the current facial feature coordinates of the current image after the smooth treatment (P)=the current facial feature coordinates of the current image prior to the smooth treatment (P1)×b+the facial feature coordinates of a previous face image after the smooth treatment (P2)×(1−b), wherein b is a predetermined scale coefficient.

In sum, the current facial feature coordinates of the current image are subjected to a smooth treatment to make the motion of the facial features smoother, so as to prevent motion of the facial features from being discontinue during the process for displaying the face images.

Seventh Embodiment

Figure 12:
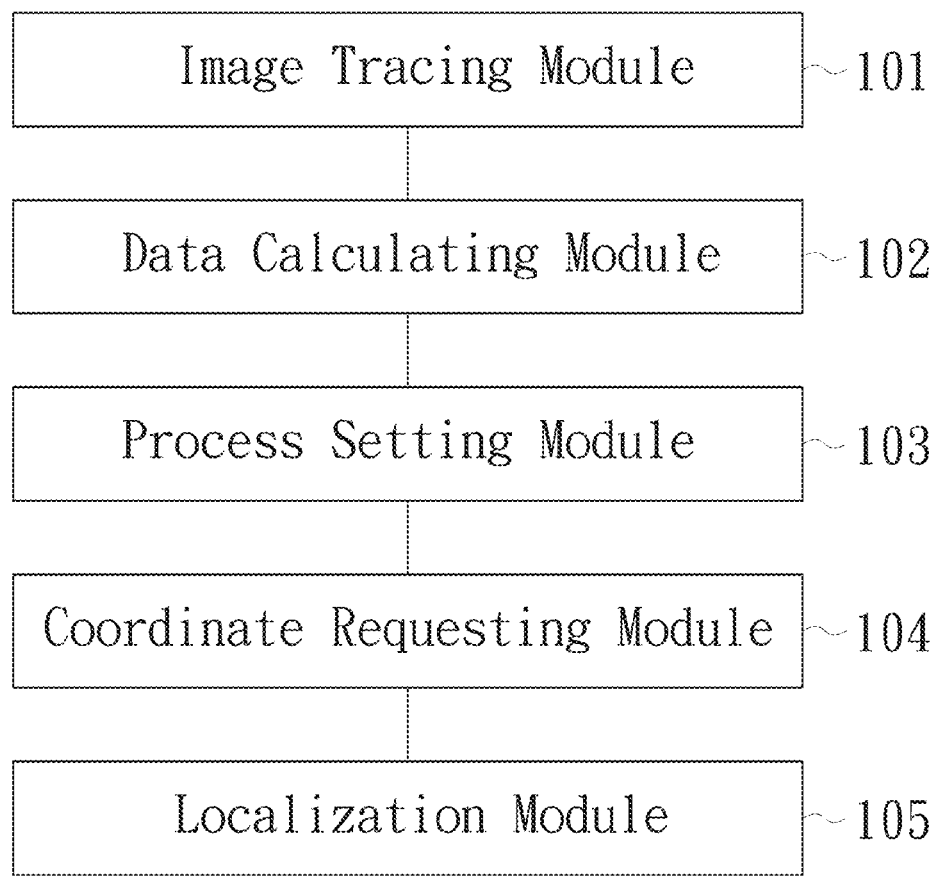
FIG. 12 is a block diagram illustrating the apparatus for identifying facial features, in accordance with a seventh embodiment of the present invention.

FIG. 12 is a block diagram illustrating the apparatus 100 for identifying facial features, in accordance with a seventh embodiment of the present invention, wherein the apparatus 100 comprises an image tracing module 101, a data calculating module 102, a process setting module 103, a coordinate requesting module 104 and a localization module 105. It should be appreciated that the above modules are just used to illustrate the processes or steps for providing a single or multiple functions. In addition, although the modules are designated with different reference number, it does not mean that the processes or steps of the modules are separated with each other.

The image tracing module 101 is used to request video data of a plurality of face images and to obtain a real-time background image from the video data by a video tracing technique during a process for displaying the plurality of face images.

The data calculating module 102 is used to calculate a video data difference between a current face image and the real-time background image. In practice, the current face image and the real-time background image are firstly received by the data calculating module 102. Difference of the current face image and the real-time background image that are both subjected to a gray degree treatment is then obtained by the data calculating module 102 to form a prospective view image. The pixels of the foreground image are classified in at least two groups according to different criteria for evaluating the gray degree of the pixels of the foreground image, and a weight value is given to the pixels of the foreground image that are classified within the same group. The video data difference is then obtained by the data calculating module 102 in a manner of calculating the ratio of the weighted sum of the pixels number to the pixels number of the foreground image.

The process setting module 103 is used to set an iteration number according to the video data difference.

The coordinate requesting module 104 is used to obtain facial feature coordinates of a previous face image, the previous one of the current face image, to serve as initial facial feature coordinates.

The localization module 105 is used to obtain current facial feature coordinates of the current image by conducting an iterative calculation according to the iteration number to localize the facial features of the current image based on the initial facial feature coordinates.

Since the detailed process and the mechanism for applying the apparatus 100 to identify facial features has been described in the first embodiment, and thus the detail step and mechanism thereof will not be redundantly described herein.

By applying the apparatus 100 for identifying facial features provided by the seventh embodiment, current facial feature coordinates of a current image can be obtained by conducting an iterative calculation based on video data of a previous face image, the previous one of the current face image, thus face images can be displayed with a quicker operating speed, and the display performance of the electronic equipment can be improved due to smoother motion of the identified facial features during the process for displaying the face images.

Eighth Embodiment

Figure 13:
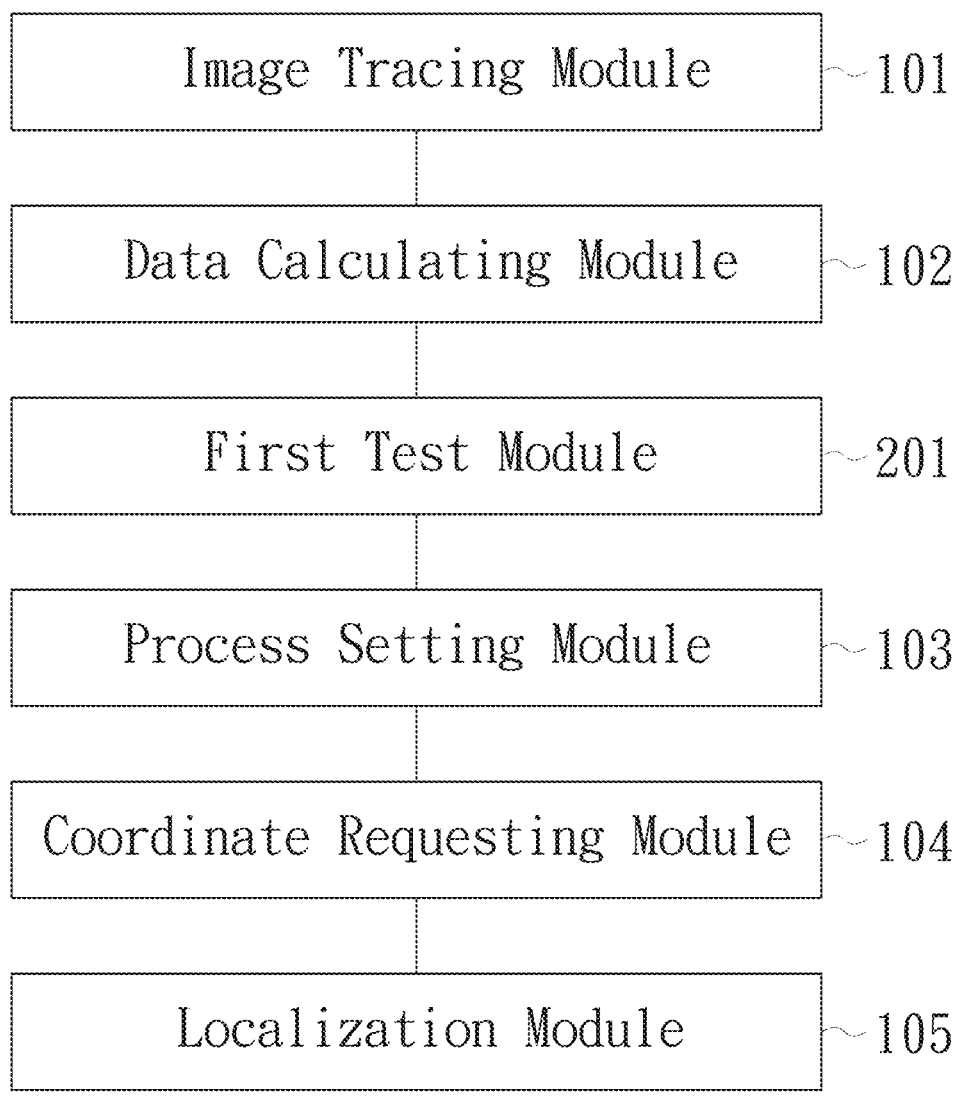
FIG. 13 is a block diagram illustrating the apparatus for identifying facial features, in accordance with a eighth embodiment of the present invention.

FIG. 13 is a block diagram illustrating the apparatus 200 for identifying facial features, in accordance with a eighth embodiment of the present invention, wherein the apparatus 200 is similar to the apparatus 100 described in the seventh embodiment except that the apparatus 200 further comprises a first test module 201. In the present embodiment, the first test module 201 is applied after the process designated to the data calculating module 102 is carried out.

The first test module 201 is used to determine whether the video data difference is less than a first threshold value. If the video data difference is not less than the first threshold value, the process designated to the process setting module 103 is performed; and if the video data difference is less than the first threshold value, the facial feature coordinates of the previous face image are requested to be referred to as the current facial feature coordinates of the current image.

Since the detailed process and the mechanism for applying the apparatus 200 to identify facial features has been described in the second embodiment, and thus the detail step and mechanism thereof will not be redundantly described herein.

By applying the apparatus 200 for identifying facial features provided by the eighth embodiment, the iterative calculation can be omitted and the facial feature coordinates of the previous face image are directly used to serve as the current facial feature coordinates of the current image, while a context that the face images remain unchanged during the process of displaying is determined. Accordingly, computing resources can be saved and the operation speed of the electronic equipment 1 cane improved.

Ninth Embodiment

Figure 14:
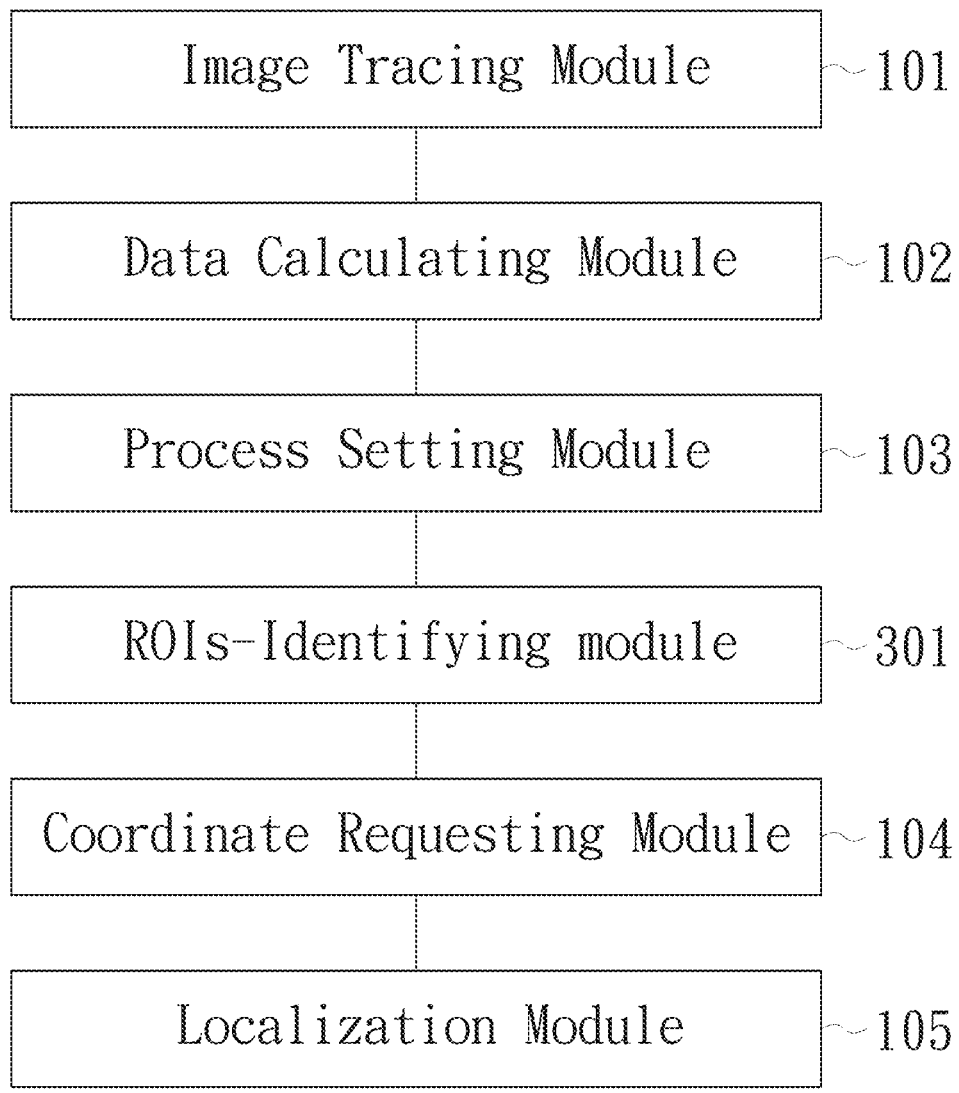
FIG. 14 is a block diagram illustrating the apparatus for identifying facial features, in accordance with a ninth embodiment of the present invention.

FIG. 14 is a block diagram illustrating the apparatus 300 for identifying facial features, in accordance with a ninth embodiment of the present invention, wherein the apparatus 300 is similar to the apparatus 100 described in the seventh embodiment and the apparatus 200 described in the eighth embodiment except that the apparatus 300 further comprises a regions of interest (ROIs)-identifying module 301. In the present embodiment, the ROIs-identifying module 301 is applied after the process designated to the process setting module 103 is carried out.

The ROIs-identifying module 301 is used to identify the ROIs of the current face image according to the video data difference. In addition, the ROIs-identifying module 301 is further used to perform an illumination normalization treatment on the ROIs to obtain the current facial feature coordinates of the current image merely based on the initial facial feature coordinates involved in the ROIs.

Since the detailed process and the mechanism for applying the apparatus 300 to identify facial features has been described in the third embodiment, and thus the detail step and mechanism thereof will not be redundantly described herein.

By applying the apparatus 300 for identifying facial features provided by the ninth embodiment, mere the current facial feature coordinates of the current image involved in the ROIs can be obtained by the iterative calculation. Accordingly, computing resources can be saved and the operation speed of the electronic equipment 1 cane improved.

Tenth Embodiment

Figure 15:
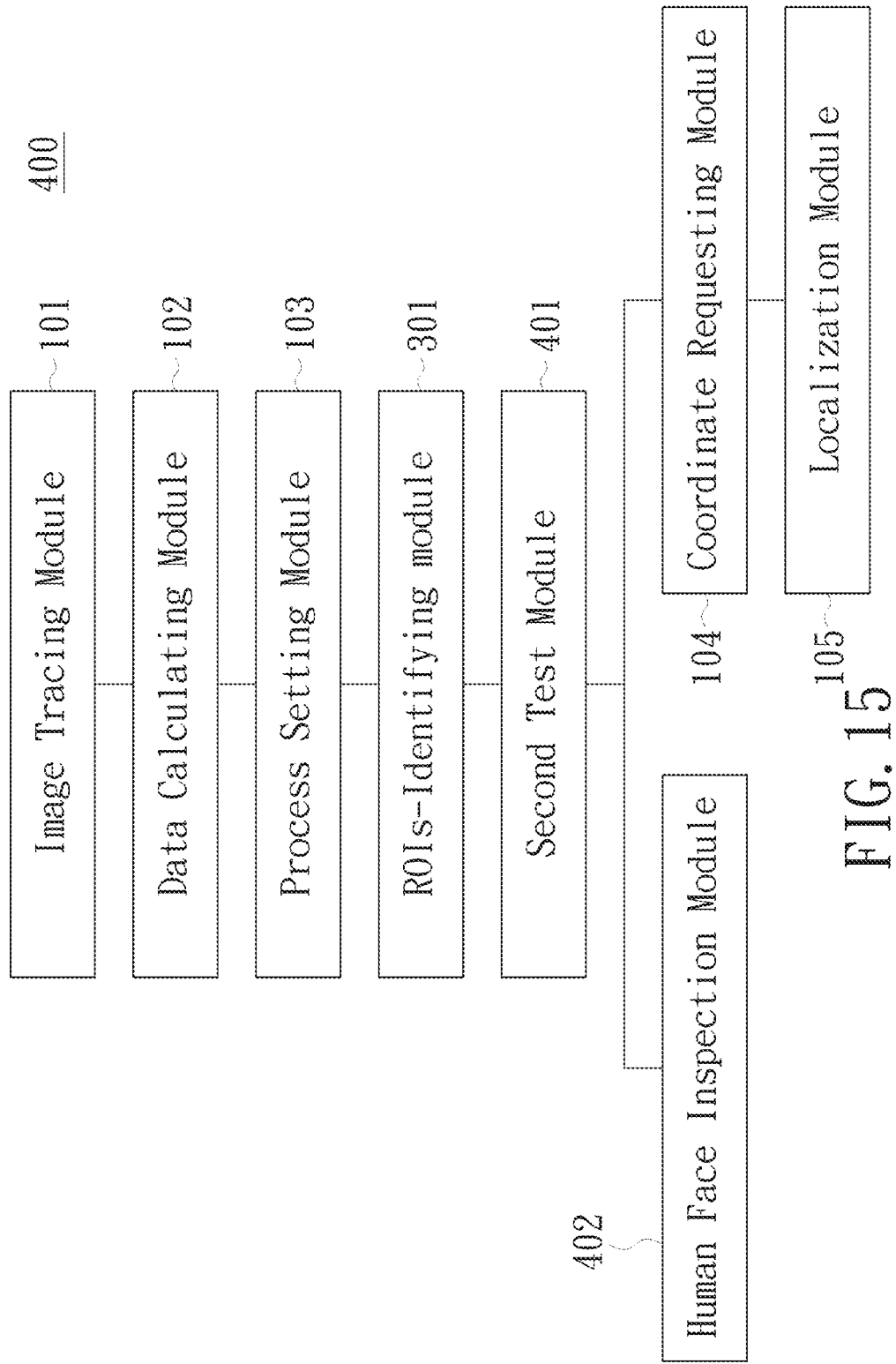
FIG. 15 is a block diagram illustrating the apparatus for identifying facial features, in accordance with a tenth embodiment of the present invention.

FIG. 15 is a block diagram illustrating the apparatus 400 for identifying facial features, in accordance with a tenth embodiment of the present invention, wherein the apparatus 400 is similar to the apparatus 300 described in the ninth embodiment except that the apparatus 400 further comprises a second test module 401 and a human face inspection module 402. In the present embodiment, the second test module 401 is applied after the process designated to the ROIs-identifying module 301 is carried out.

The second test module 401 is used to determine whether the video data difference is greater than a second threshold value. If the video data difference is not greater than the second threshold value, the process designated to the coordinate requesting module 104 is then performed; and if the video data difference is greater than the second threshold value, the process designated to the human face inspection module 402 is then performed.

The human face inspection module 402 is used to obtain a training value of the facial feature coordinates involved in the ROIs. The training value of the facial feature coordinates are then referred to as the initial facial feature coordinates. The process designated to the localization module 105 is then performed.

Since the detailed process and the mechanism for applying the apparatus 400 to identify facial features has been described in the fourth embodiment, and thus the detail step and mechanism thereof will not be redundantly described herein.

By applying the apparatus 400 for identifying facial features provided by the tenth embodiment, the initial facial feature coordinates can be redefined according to the training value of the facial feature coordinates, while a context that a great change occurs among the face images during the process of displaying is determined. Accordingly, computing resources can be saved and the operation speed of the electronic equipment 1 cane improved.

Eleventh Embodiment

Figure 16:
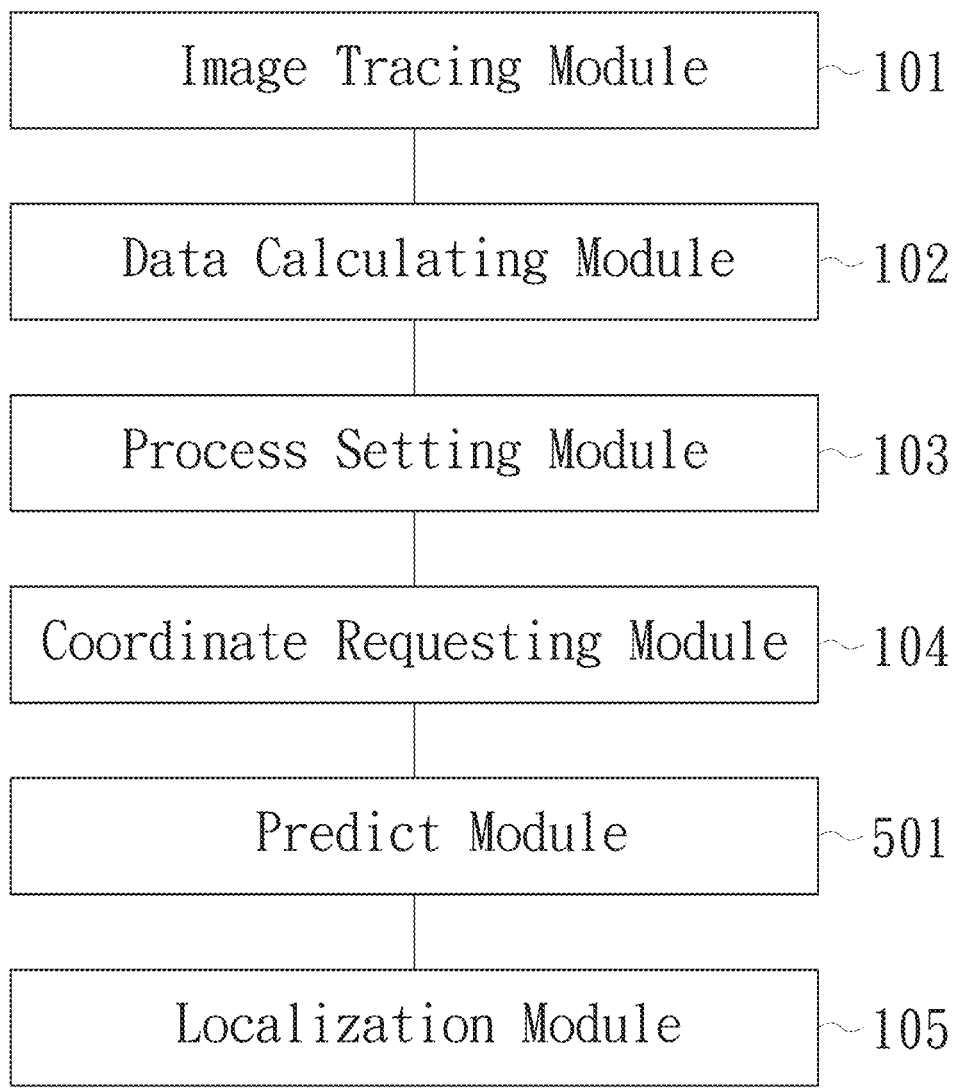
FIG. 16 is a block diagram illustrating the apparatus for identifying facial features, in accordance with a eleventh embodiment of the present invention.

FIG. 16 is a block diagram illustrating the apparatus 500 for identifying facial features, in accordance with a eleventh embodiment of the present invention, wherein the apparatus 500 is similar to the apparatus 100 described in the seventh embodiment except that the apparatus 500 further comprises a predict module 501. In the present embodiment, the predict module 501 is applied prior to the process designated to the localization module 105.

The predict module 501 is used to predict moving speed and direction of the facial features varying between the current face image and the previous face image, and the initial facial feature coordinates are adjusted according to the predicted moving speed and direction of the facial features The localization module 105 is then applied to perform the iterative calculation based on the adjusted initial facial feature coordinates to obtain the current feature coordinates of the current image correspondingly.

In addition, the localization module 105 may be applied to further adjust the current feature coordinates of the current image and the predicted moving speed and direction of the facial features.

Since the detailed process and the mechanism for applying the apparatus 500 to identify facial features has been described in the fifth embodiment, and thus the detail step and mechanism thereof will not be redundantly described herein.

By applying the apparatus 500 for identifying facial features provided by the eleventh embodiment, a Kalman filter is applied to predict the moving speed and direction of the facial features varying between the current face image and the previous face image. The initial facial feature coordinates can be adjusted according to the predicted moving speed and direction of the facial features. The current feature coordinates of the current image and the predicted moving speed and direction of the facial features can be further adjusted. Such that, more accurate current facial feature coordinates of the current image more accurate current facial feature coordinates of the current image can be obtained.

Twelfth Embodiment

Figure 17:
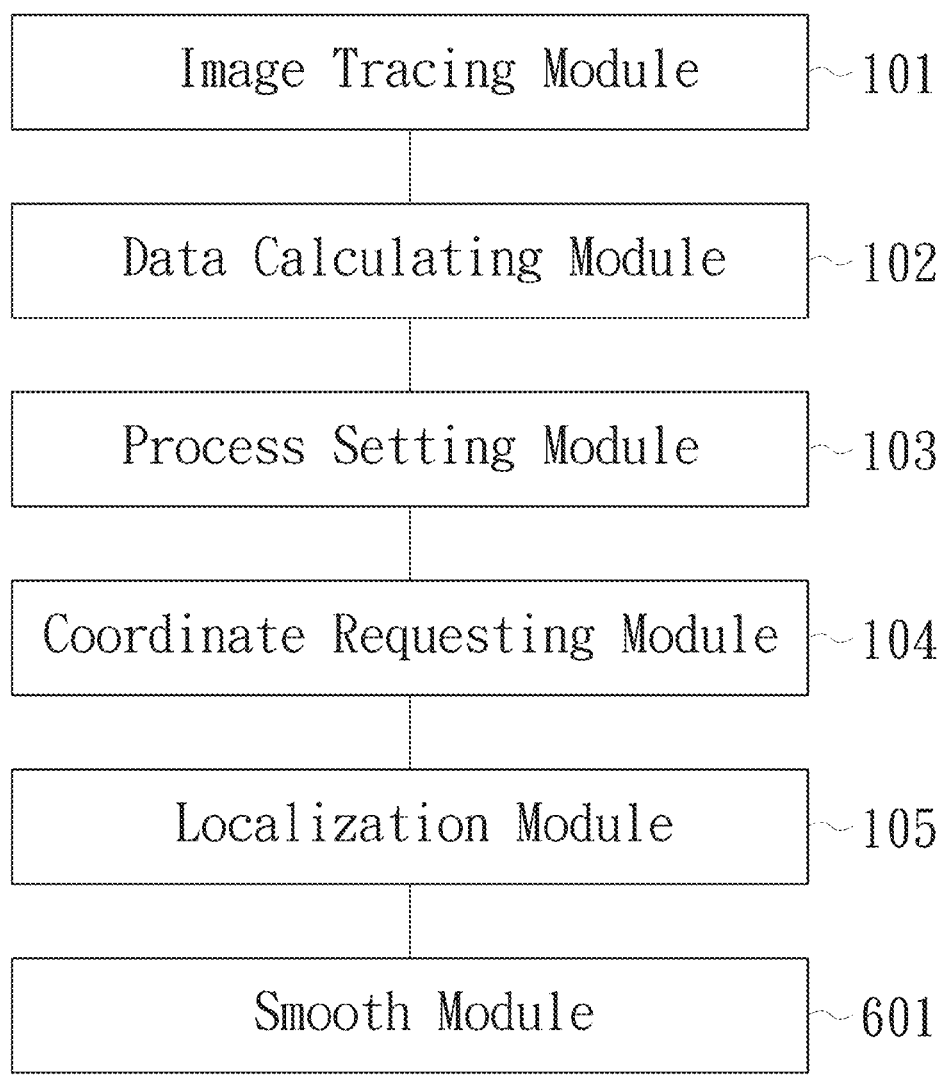
FIG. 17 is a block diagram illustrating the apparatus for identifying facial features, in accordance with a twelfth embodiment of the present invention.

FIG. 17 is a block diagram illustrating the apparatus for identifying facial features, in accordance with a twelfth embodiment of the present invention, wherein the apparatus 600 is similar to the apparatus 100 described in the seventh embodiment except that the apparatus 500 further comprises a smooth module 601. In the present embodiment, the smooth module 601 is applied after the process designated to the localization module 105 is carried out.

The smooth module 601 is used to perform a smooth treatment to the current facial feature coordinates of the current image.

Since the detailed process and the mechanism for applying the apparatus 600 to identify facial features has been described in the sixth embodiment, and thus the detail step and mechanism thereof will not be redundantly described herein.

By applying the apparatus 600 for identifying facial features provided by the twelfth embodiment, the current facial feature coordinates of the current image are subjected to a smooth treatment to make the motion of the facial features smoother, so as to prevent motion of the facial features from being discontinue during the process for displaying the face images.

Besides, a person skilled in the art would recognize that the method and process disclosed within the aforementioned embodiments can be, either entirely or partially, implemented by hardware that is controlled by a program stored in a medium, wherein the medium may be a read-only memory (ROM), a disk memory, or a compact disk.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for identifying facial features, for executed by an electronic equipment, the method comprising:
    receiving video data of a plurality of face images and to obtain a real-time background image from the video data by a video tracing technique during a process for displaying the plurality of face images;
    calculating a video data difference between a current face image and the real-time background image;
    setting an iteration number according to the video data difference;
    obtaining facial feature coordinates of a previous face image, the previous one of the current face image, serving as initial facial feature coordinates; and
    obtaining current facial feature coordinates of the current image, wherein an iterative calculation is conducted according to the iteration number to localize the facial features of the current image based on the initial facial feature coordinates, and the step of calculating the video data comprises:

receiving the current face image and the real-time background image that are both subjected to a gray degree treatment;
obtaining difference of the current face image and the real-time background image to form a prospective view image;
classifying pixels of the foreground image in at least two groups according to different criteria for evaluating the gray degree of the pixels of the foreground image, and giving a weight value to the pixels of the foreground image that are classified within the same group; and
obtaining the video data difference by calculating a ratio of a weighted sum of the pixels number to the pixels number of the foreground image.

2. A method for identifying facial features, for executed by an electronic equipment, the method comprising:
receiving video data of a plurality of face images and to obtain a real-time background image from the video data by a video tracing technique during a process for displaying the plurality of face images;
calculating a video data difference between a current face image and the real-time background image;
setting an iteration number according to the video data difference;
obtaining facial feature coordinates of a previous face image, the previous one of the current face image, serving as initial facial feature coordinates; and
obtaining current facial feature coordinates of the current image, wherein an iterative calculation is conducted according to the iteration number to localize the facial features of the current image based on the initial facial feature coordinates, and the step of calculating the video data comprises:
performing a first test to determine whether the video data difference is less than a first threshold value;
if the video data difference is not less than the first threshold value, the step of setting an iteration number is performed; and
if the video data difference is less than the first threshold value, the facial feature coordinates of the previous face image are referred to as the current facial feature coordinates of the current image.

3. The method according to claim 2, wherein the step of setting an iteration number further comprises identifying regions of interest (ROIs) of the current face image according to the video data difference; and
the step of obtaining current facial feature coordinates of the current image further comprises conducting the iterative calculation to obtain the current facial feature coordinates of the current image based on the initial facial feature coordinates merely involved in the ROIs.

4. The method according to claim 3, wherein the step of identifying ROIs of the current face image further comprises performing an illumination normalization treatment on the ROIs.

5. The method according to claim 3, wherein the step of identifying ROIs of the current face image further comprises:
performing a second test to determine whether the video data difference is greater than a first threshold value; and
if the video data difference is not greater than the second threshold value, the step of obtaining facial feature coordinates of a previous face image is performed.

6. The method according to claim 5, wherein the step of identifying ROIs of the current face image further comprises:
obtaining a training value of the facial feature coordinates involved in the ROIs if the video data difference is greater than the second threshold value;
referring the facial feature coordinates of the previous face image as the current facial feature coordinates of the current image;
referring the training value of the facial feature coordinates as the initial facial feature coordinates; and
performing the step of obtaining current facial feature coordinates of the current image.

7. A method for identifying facial features, for executed by an electronic equipment, the method comprising:
receiving video data of a plurality of face images and to obtain a real-time background image from the video data by a video tracing technique during a process for displaying the plurality of face images;
calculating a video data difference between a current face image and the real-time background image;
setting an iteration number according to the video data difference;
obtaining facial feature coordinates of a previous face image, the previous one of the current face image, serving as initial facial feature coordinates; and
obtaining current facial feature coordinates of the current image, wherein an iterative calculation is conducted according to the iteration number to localize the facial features of the current image based on the initial facial feature coordinates, and the step of obtaining current facial feature coordinates of the current image comprises:
predicting moving speed and direction of facial features varying between the current face image and the previous face image;
adjusting the initial facial feature coordinates according to the predicted moving speed and direction of the facial features; and
performing the iterative calculation based on the adjusted initial facial feature coordinates to obtain the current feature coordinates of the current image.

8. The method according to claim 1, wherein the step of obtaining current facial feature coordinates of the current image further comprises adjusting the current feature coordinates of the current image and the predicted moving speed and direction of the facial features.

9. The method according to claim 1, wherein the step of obtaining current facial feature coordinates of the current image further comprises: performing a smooth treatment to the current facial feature coordinates of the current image.

10. An electronic equipment for identifying facial features, comprising: a display panel; a memory; one or more processors; and one or more modules stored in the memory and configured for execution by the one or more processors, the one or more modules comprising:
an image tracing module, comprising instructions to request video data of a plurality of face images and to obtain a real-time background image from the video data by a video tracing technique during a process for displaying the plurality of face images on the display panel;
a data calculating module, comprising instructions to calculate a video data difference between a current face image and the real-time background image;
a process setting module, comprising instructions to set an iteration number according to the video data difference;
a coordinate requesting module, comprising instructions to obtain facial feature coordinates of a previous face image, the previous one of the current face image, serving as initial facial feature coordinates; and
a localization module, comprising instructions to obtain current facial feature coordinates of the current image by conducting an iterative calculation according to the iteration number to localize the facial features of the current image based on the initial facial feature coordinates, wherein the data calculating module comprises instructions to:

receive the current face image and the real-time background image that are both subjected to a gray degree treatment;

obtain difference of the current face image and the real-time background image to form a prospective view image;

classify pixels of the foreground image in at least two groups according to different criteria for evaluating the gray degree of the pixels of the foreground image, and give a weight value to the pixels of the foreground image that are classified within the same group; and obtain the video data difference by calculating a ratio of a weighted sum of the pixels number to the pixels number of the foreground image.

11. An electronic equipment for identifying facial features, comprising: a display panel; a memory; one or more processors; and one or more modules stored in the memory and configured for execution by the one or more processors, the one or more modules comprising:

an image tracing module, comprising instructions to request video data of a plurality of face images and to obtain a real-time background image from the video data by a video tracing technique during a process for displaying the plurality of face images on the display panel;

a data calculating module, comprising instructions to calculate a video data difference between a current face image and the real-time background image;

a process setting module, comprising instructions to set an iteration number according to the video data difference;

a coordinate requesting module, comprising instructions to obtain facial feature coordinates of a previous face image, the previous one of the current face image, serving as initial facial feature coordinates;

a localization module, comprising instructions to obtain current facial feature coordinates of the current image by conducting an iterative calculation according to the iteration number to localize the facial features of the current image based on the initial facial feature coordinates; and a first test module, comprising instructions to determine whether the video data difference is less than a first threshold value;

if the video data difference is not less than the first threshold value, the process setting module is executed; and if the video data difference is less than the first threshold value, the facial feature coordinates of the previous face image are referred to as the current facial feature coordinates of the current image.

12. The apparatus according to claim 11, wherein the one or more modules comprises:

a regions of interest (ROIs)-identifying module, comprising instructions to identify regions of interest (ROIs) of the current face image according to the video data difference, wherein the localization module is applied to obtain the current facial feature coordinates of the current image by conducting the iterative calculation based on the initial facial feature coordinates merely involved in the ROIs.

13. The apparatus according to claim 12, wherein the localization module further comprises instructions to perform an illumination normalization treatment on the ROIs.

14. The apparatus according to claim 12, wherein the one or more modules comprises:

a second test module, comprising instructions to determine whether the video data difference is greater than a first threshold value; and if the video data difference is not greater than the second threshold value, the process designated to the coordinate requesting module is executed.

15. The apparatus according to claim 14, wherein the one or more modules comprises:

a human face inspection module, comprising instructions to obtain a training value of the facial feature coordinates involved in the ROIs, if the video data difference is greater than the second threshold value, to refer to the training value of the facial feature coordinates as the initial facial feature coordinates, and to execute the localization module.

16. An electronic equipment for identifying facial features, comprising: a display panel; a memory; one or more processors; and one or more modules stored in the memory and configured for execution by the one or more processors, the one or more modules comprising:

an image tracing module, comprising instructions to request video data of a plurality of face images and to obtain a real-time background image from the video data by a video tracing technique during a process for displaying the plurality of face images on the display panel;

a data calculating module, comprising instructions to calculate a video data difference between a current face image and the real-time background image;

a process setting module, comprising instructions to set an iteration number according to the video data difference;

a coordinate requesting module, comprising instructions to obtain facial feature coordinates of a previous face image, the previous one of the current face image, serving as initial facial feature coordinates;

a localization module, comprising instructions to obtain current facial feature coordinates of the current image by conducting an iterative calculation according to the iteration number to localize the facial features of the current image based on the initial facial feature coordinates; and a predict module, comprising instructions to predict moving speed and direction of facial features varying between the current face image and the previous face image, and to adjust the initial facial feature coordinates according to the predicted moving speed and direction of the facial features, whereby the localization module can be used to perform the iterative calculation based on the adjusted initial facial feature coordinates to obtain the current feature coordinates of the current image.

17. The apparatus according to claim 10, wherein the localization module further comprises instructions to adjust the current feature coordinates of the current image and the predicted moving speed and direction of the facial features.

18. The apparatus according to claim 10, wherein the one or more modules comprises a smooth module, comprising instructions to perform a smooth treatment to the current facial feature coordinates of the current image.

19. The method according to claim 2, wherein the step of obtaining current facial feature coordinates of the current image further comprises adjusting the current feature coordinates of the current image and the predicted moving speed and direction of the facial features.

20. The method according to claim 7, wherein the step of obtaining current facial feature coordinates of the current image further comprises adjusting the current feature coordinates of the current image and the predicted moving speed and direction of the facial features.

21. The method according to claim 2, wherein the step of obtaining current facial feature coordinates of the current image further comprises: performing a smooth treatment to the current facial feature coordinates of the current image.

22. The method according to claim 7, wherein the step of obtaining current facial feature coordinates of the current image further comprises: performing a smooth treatment to the current facial feature coordinates of the current image.

23. The apparatus according to claim 11, wherein the localization module further comprises instructions to adjust the current feature coordinates of the current image and the predicted moving speed and direction of the facial features.

24. The apparatus according to claim 16, wherein the localization module further comprises instructions to adjust the current feature coordinates of the current image and the predicted moving speed and direction of the facial features.

25. The apparatus according to claim 11, wherein the one or more modules comprises a smooth module, comprising instructions to perform a smooth treatment to the current facial feature coordinates of the current image.

26. The apparatus according to claim 16, wherein the one or more modules comprises a smooth module, comprising instructions to perform a smooth treatment to the current facial feature coordinates of the current image.

* * * * *